(12) United States Patent
Li et al.

(10) Patent No.: US 11,764,845 B2
(45) Date of Patent: Sep. 19, 2023

(54) CHANNEL STATE INFORMATION FOR MULTIPLE ACCESS POINTS

(71) Applicant: Intel Corporation, Santa Clara, CA (US)

(72) Inventors: Qinghua Li, San Ramon, CA (US); Feng Jiang, Sunnyvale, CA (US); Xiaogang Chen, Portland, OR (US); Po-Kai Huang, San Jose, CA (US); Jonathan Segev, Sunnyvale, CA (US); Dibakar Das, Hilsboro, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 17/012,796

(22) Filed: Sep. 4, 2020

(65) Prior Publication Data

US 2020/0403680 A1 Dec. 24, 2020

Related U.S. Application Data

(60) Provisional application No. 62/931,648, filed on Nov. 6, 2019, provisional application No. 62/928,040, filed on Oct. 30, 2019.

(51) Int. Cl.
*H04B 7/06* (2006.01)
*H04B 7/024* (2017.01)
*H04B 7/0452* (2017.01)
*H04W 84/12* (2009.01)

(52) U.S. Cl.
CPC .......... *H04B 7/0626* (2013.01); *H04B 7/024* (2013.01); *H04B 7/0452* (2013.01); *H04B 7/0617* (2013.01); *H04W 84/12* (2013.01)

(58) Field of Classification Search
CPC .... H04B 7/0626; H04B 7/024; H04B 7/0452; H04B 7/0617; H04B 7/0628; H04B 7/0632; H04B 7/0695; H04W 84/12; H04W 48/12
See application file for complete search history.

(56) References Cited

U.S. PATENT DOCUMENTS

| 2016/0295581 A1* | 10/2016 | Ghosh | H04W 72/0446 |
|---|---|---|---|
| 2018/0262936 A1* | 9/2018 | Zhou | H04J 11/0053 |
| 2018/0263043 A1* | 9/2018 | Zhou | H04L 5/005 |
| 2018/0263044 A1* | 9/2018 | Zhou | H04L 5/0035 |
| 2019/0028168 A1* | 1/2019 | Vermani | H04B 7/0626 |

(Continued)

*Primary Examiner* — Habte Mered
(74) *Attorney, Agent, or Firm* — Schwegman Lundberg & Woessner, P.A.

(57) ABSTRACT

Methods, apparatuses, and computer readable media for channel state information for multiple access points are disclosed. Channel station information (CSI) may be coordinated for multiple access points (APs) where one AP may act as a master AP with other AP acting as slave APs. The channel station information may be based on information from null data packets received by stations from multiple-APs, which may enable a multi-AP coordinated beamforming (CBF) to be determined based on the received first CSI reports. New frame formats are disclosed that include fields for including APs. Overlapping basic service set (OBSS) stations may respond to APs that are not within their BSS. Some embodiments relate to passive range finding in a multi-AP sounding where location configuration information (LCI) changes for one of the APs.

19 Claims, 26 Drawing Sheets

(56) References Cited

U.S. PATENT DOCUMENTS

| | | | |
|---|---|---|---|
| 2019/0045366 A1* | 2/2019 | Vermani | H04B 7/0626 |
| 2019/0081664 A1* | 3/2019 | Vermani | H04L 5/0035 |
| 2020/0076665 A1* | 3/2020 | Porat | H04B 7/024 |
| 2020/0137704 A1* | 4/2020 | Vermani | H04L 5/0035 |
| 2020/0336176 A1* | 10/2020 | Seok | H04L 5/0062 |
| 2020/0358486 A1* | 11/2020 | Suh | H04L 5/0044 |
| 2021/0359724 A1* | 11/2021 | Seok | H04W 24/02 |
| 2022/0140879 A1* | 5/2022 | Liang | H04W 24/10 375/267 |
| 2022/0182119 A1* | 6/2022 | Ravichandran | H04B 7/0626 |
| 2022/0360300 A1* | 11/2022 | Aio | H04B 7/0643 |

\* cited by examiner

| Category | Public Action | Current Passive Location LCI Table Number | Passive Location LCI Table Countdown Info | RSTA Passive Location LMR | Passive Location LCI Table (optional) |
|---|---|---|---|---|---|
| 1 | 1 | 1 | 1 | Variable | Variable |

Octets:

CHANNEL STATE INFORMATION FOR MULTIPLE ACCESS POINTS

PRIORITY CLAIM

This application claims the benefit of priority under 35 USC 119(e) to U.S. Provisional Patent Application Ser. No. 62/931,648 filed Nov. 6, 2019 and U.S. Provisional Patent Application Ser. No. 62/928,040, filed Oct. 30, 2019, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11az, IEEE 802.11ax, IEEE 802.11be, and/or IEEE 802.11 extremely high throughput (EHT). Some embodiments relate channel state information (CSI) in a multi-access point (AP) channel soundings. Some embodiments relate to passive ranging and changes to location configuration information (LCI).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 29 illustrates a primus RSTA broadcast passive TB ranging measurement report action field format, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. incorporated herein by reference in their entirety. IEEE P802.11ax™/D6.1, May 2020 is hereby incorporated by reference in its entirety.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
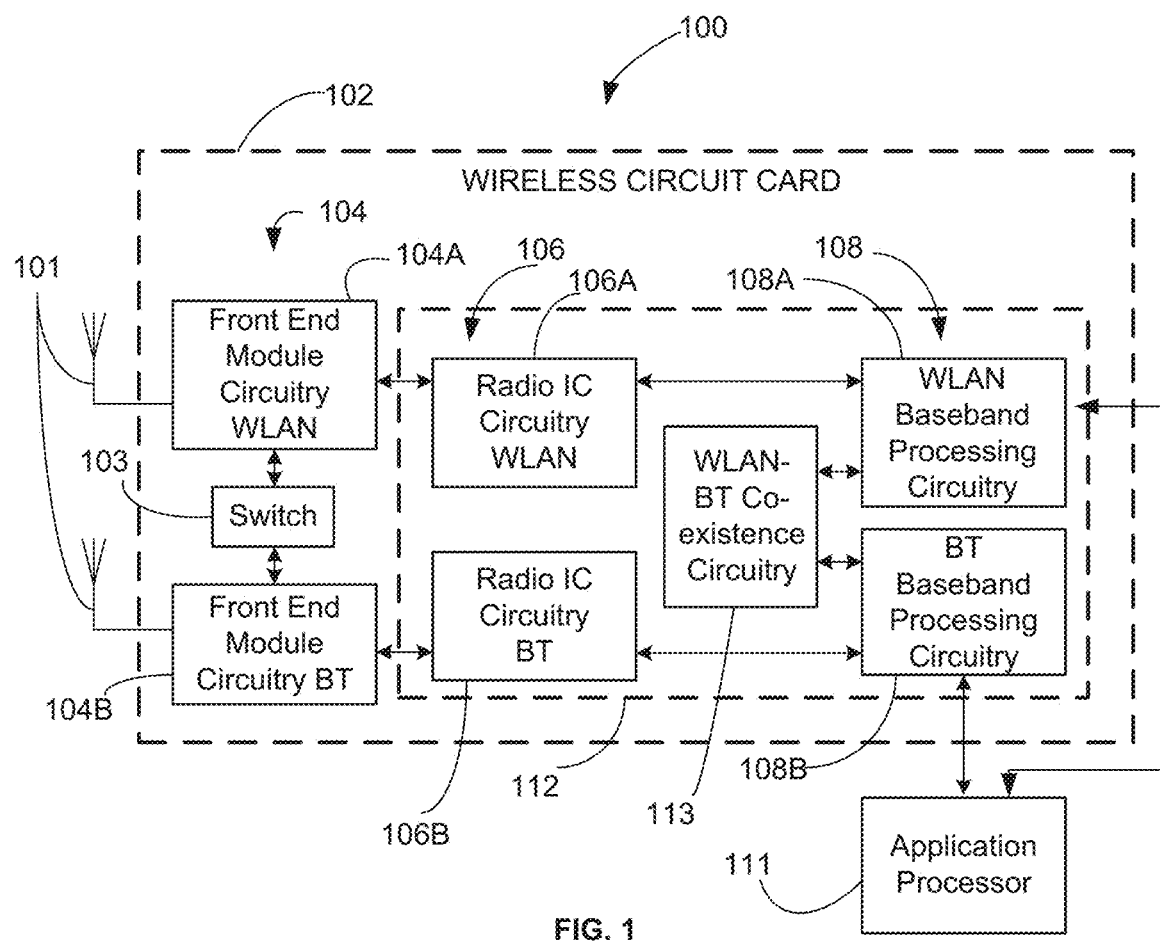
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108, Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and HEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and air signals.

Radio IC circuitry 106 as shown may include WLAN radio IC circuitry 106A and air radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
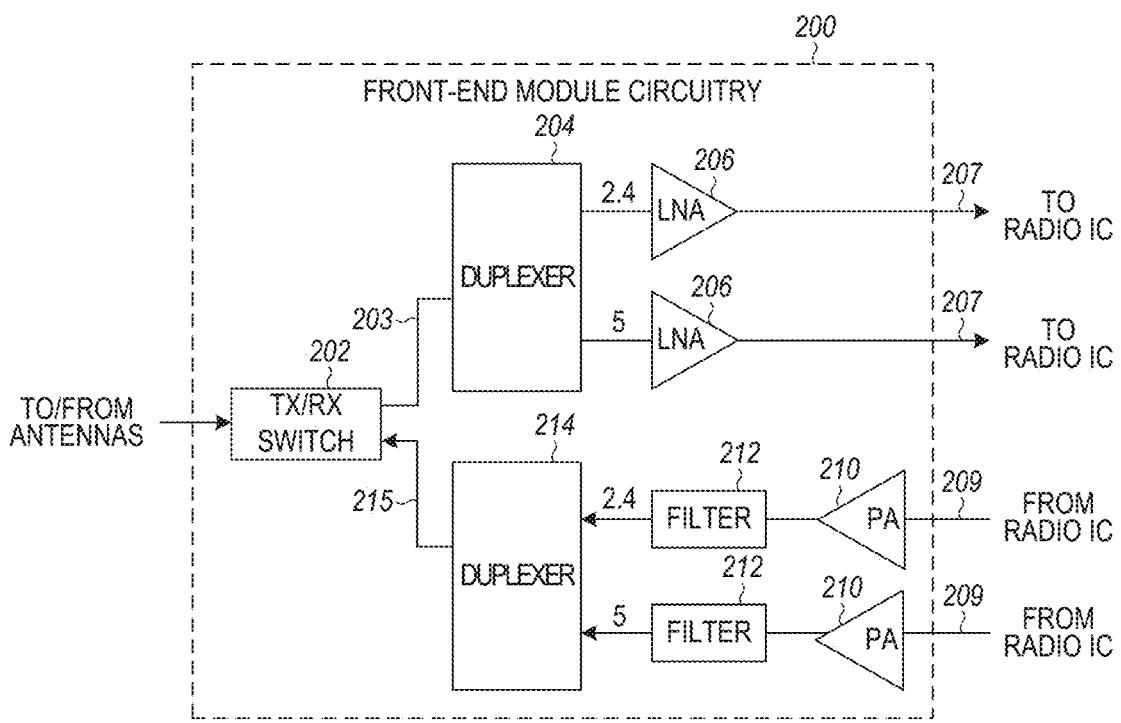
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
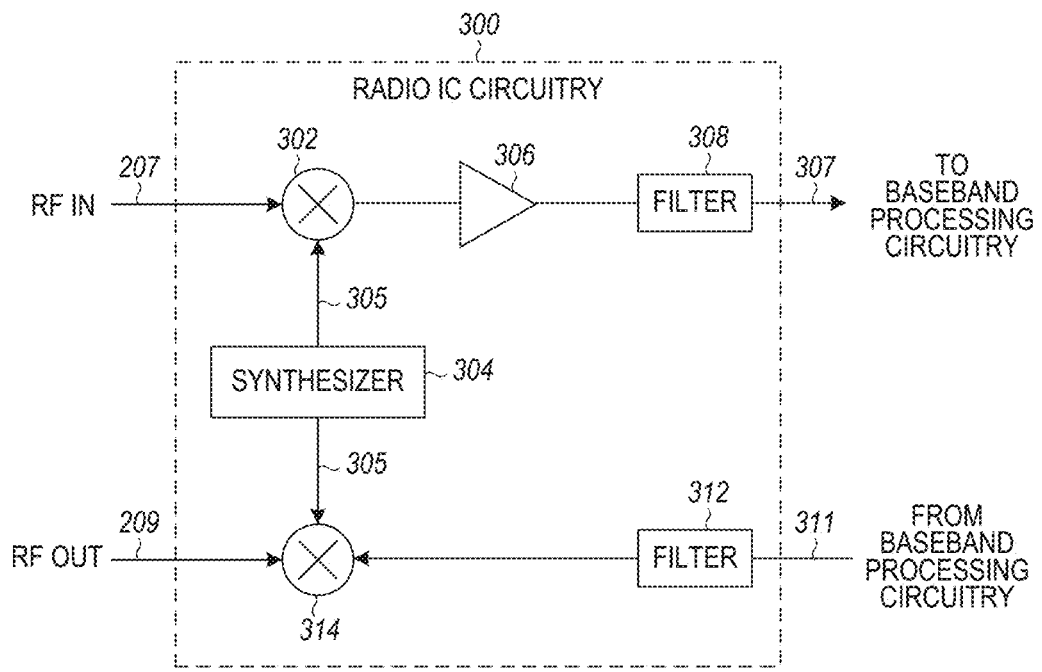
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
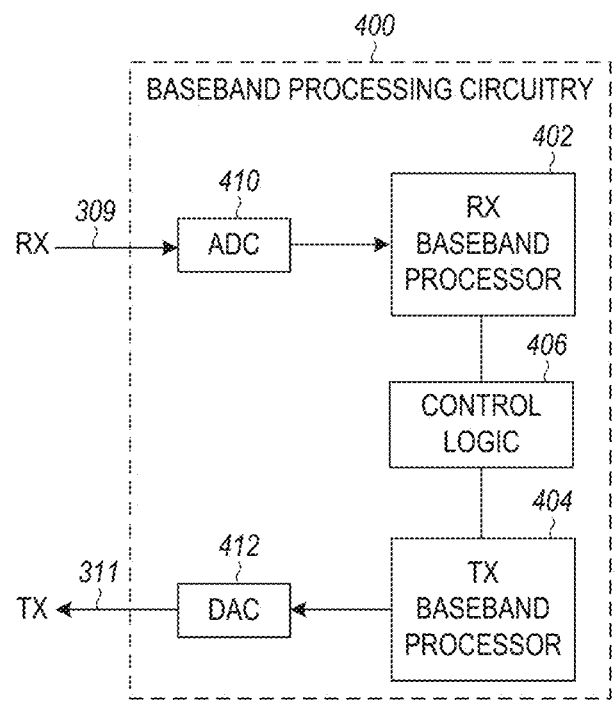
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
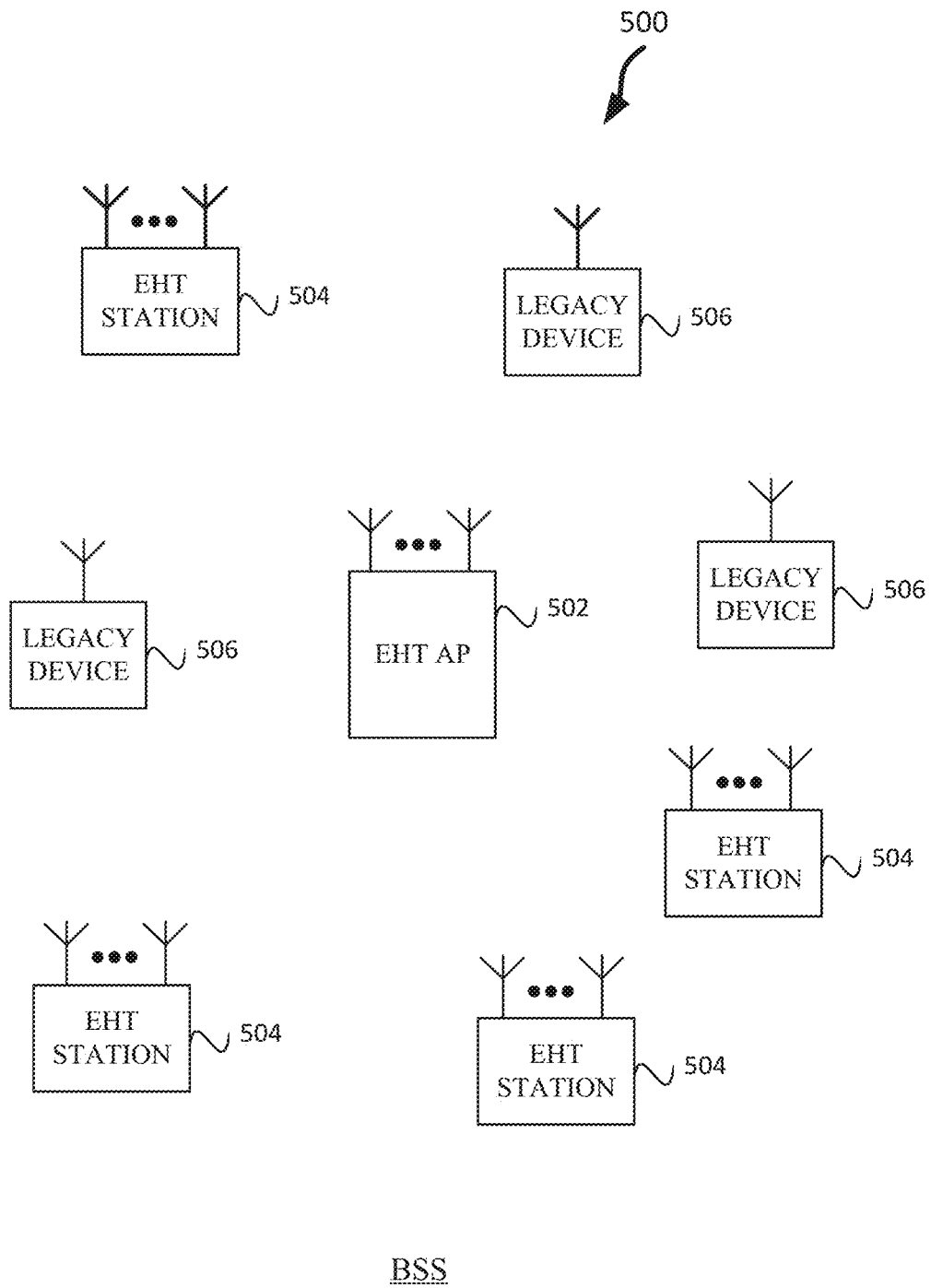
FIG. 5 illustrates a WLAN in accordance with some embodiments.

FIG. 5 illustrates a WLAN 500 in accordance with some embodiments. The WLAN 500 may comprise a basis service set (BSS) that may include a EHT access point (AP) 502, which may be termed an AP, a plurality of EHT (e.g., IEEE 802.11ax) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or EHT AP 520 are configured to operate in accordance with IEEE 802.11az and/or IEEE 802.11HE. In some embodiments, IEEE 802.11EHT may be termed Next Generation 802.11 or IEEE 802.11be.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 EHT. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one EHT APs 502 and may control more than one BSS, e.g., assign primary channels, colors, etc. EHT AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (EFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (15-95), Interim Standard 856 (IS-856), Long Term Evolution (LTE), Global System for Mobile communications (GSM), Enhanced. Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g., IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit a EHT/HE trigger frame transmission, which may include a schedule for simultaneous UL transmissions from EHT STAs 504. The EHT AP 502 may transmit a time duration of the TXOP and sub-channel information. During the TXOP, HE STAs 504 may communicate with the EHT AP 502 in accordance with a non-contention based multiple access technique such as OFDMA or MU-MIMO). This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the EHT TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a EHT station 502 or a EHT AP 502.

In some embodiments, the EHT STA 504 and/or EHT AP 502 may be configured to operate in accordance with IEEE 802.11mc. In example embodiments, the radio architecture of FIG. 1 is configured to implement the HE EHT 504 and/or the EHT AP 502. In example embodiments, the front-end module circuitry of FIG. 2 is configured to implement the EHT STA 504 and/or the HE AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-32.

In example embodiments, the EHT station 504 and/or the EHT AP 502 are configured to perform the methods and operations/functions described herein in conjunction with FIGS. 1-32. In example embodiments, an apparatus of the EHT station 504 and/or an apparatus of the EHT AP 502 are configured to perform the methods and functions described herein in conjunction with FIGS. The term Wi-Fi may refer to one or more of the IEEE 802.11 communication standards. AP and STA may refer to EHT/HE access point 502 and/or EHT/HE station 504 as well as legacy devices 506.

In some embodiments, a EHT AP STA may refer to a EHT AP 502 and/or a EHT STAs 504 that is operating as a EHT APs 502. In some embodiments, when a EHT STA 504 is not operating as a EHT AP, it may be referred to as a HE non-AP STA or EHT non-AP. In some embodiments, EHT STA 504 may be referred to as either a EHT AP STA or a EHT non-AP.

Figure 6:
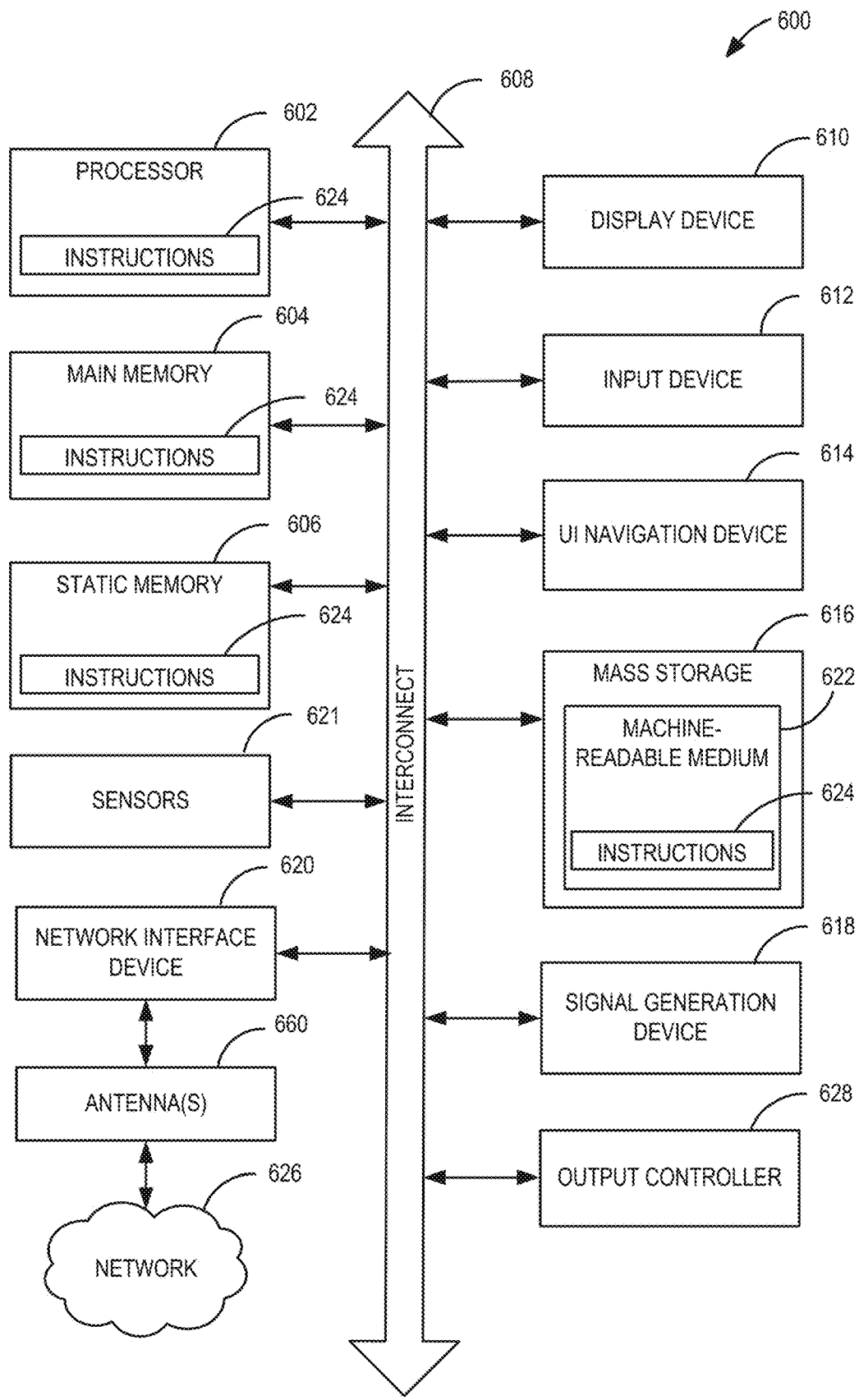
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
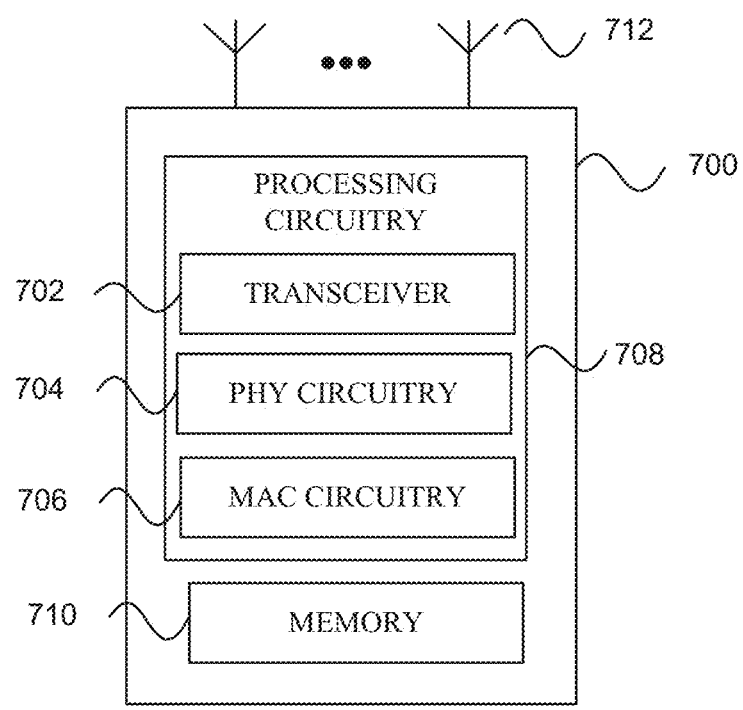
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PRY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PRY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
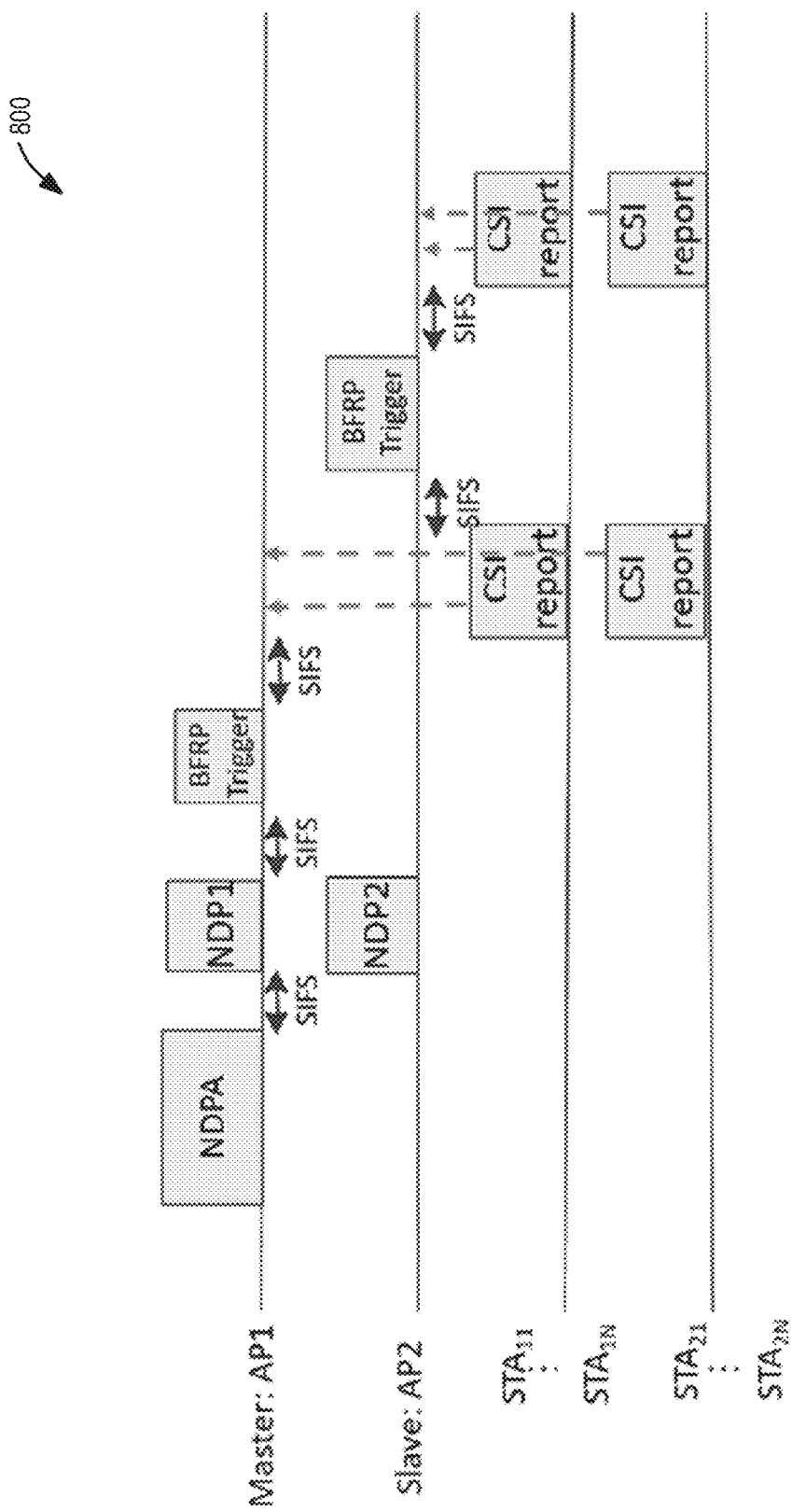
FIG. 8 illustrates a schematic diagram for CSI reporting in multi-AP channel sounding, in accordance with some embodiments.
Figure 9:
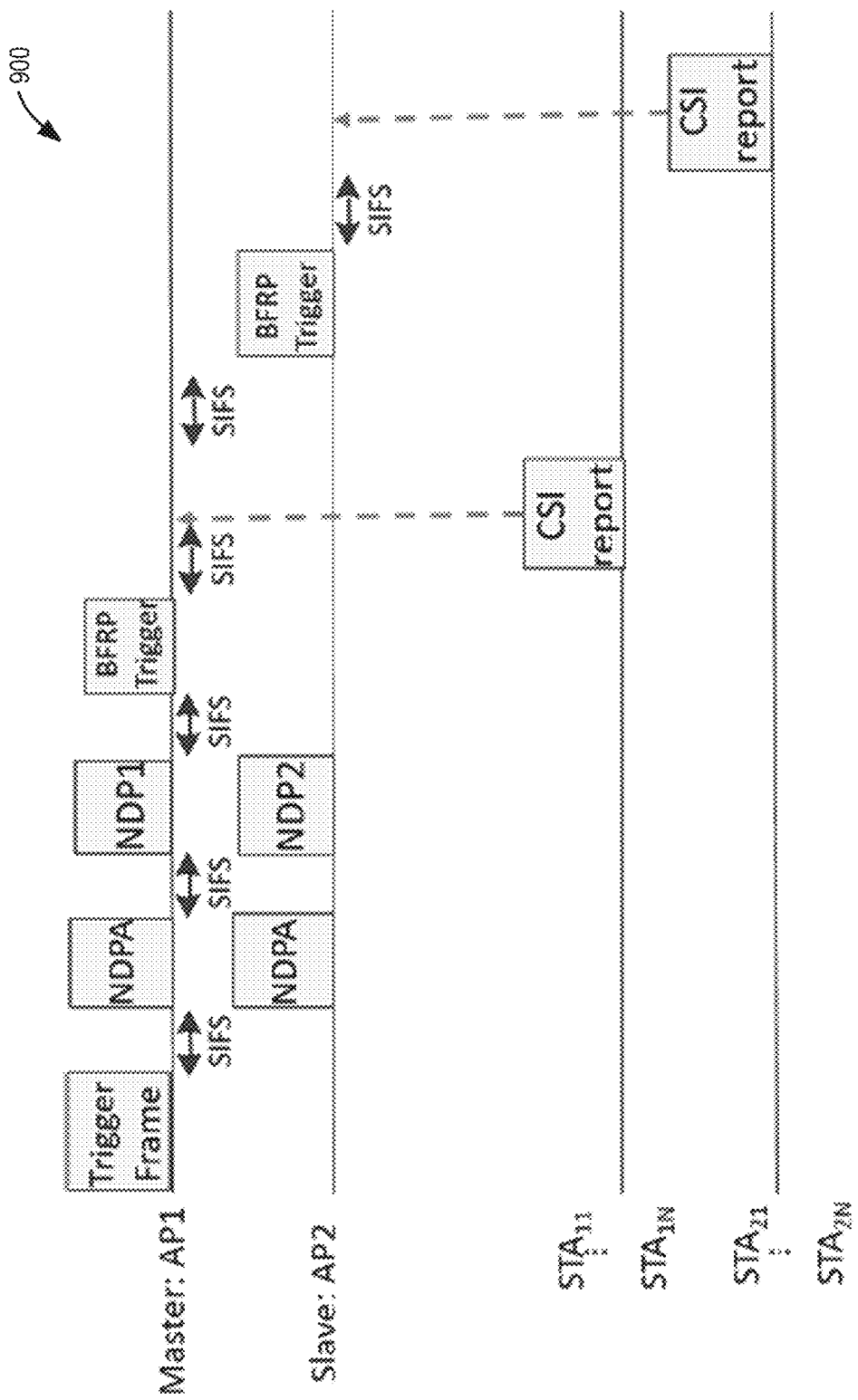
FIG. 9 illustrates a schematic diagram for CSI reporting in multi-AP channel sounding, in accordance with some embodiments.

FIG. 8 illustrates a schematic diagram for channel state information (CSI) reporting in multi-AP channel sounding 800, in accordance with some embodiments. FIG. 9 illustrates a schematic diagram for CSI reporting in multi-AP channel sounding 900, in accordance with some embodiments.

The sounding sequences in FIGS. 8 and 9 disclose channel soundings with joint transmission (JT). In the FIGS., STA11 to STA1N associates with AP1 and STA21 and STA2N associates with AP2. The master AP (AP1) and Slave AP (AP2 and AP3) perform channel sounding and receive CSI reports from STAs and these CSI reports are calculated based on the NDP1 and NDP2 jointly. For the coordinated beamforming (CBF), the APs also needs to know the CSI from STAs to design the beamforming vectors for the STAs, and with minor revisions, the channel sounding sequence for JT can be reused for the channel sounding of CBF. For example, for the CBF, the STA determines the CSI feedback based on NDP1 and NDP2 separately. In some embodiments, the STAs determine CSI feedback jointly for NDP1 and NDP2, and separately for NDP1 and NDP2. The NDP frames can be identified by the corresponding AP's BSSID, BSS color or other ID info. In one or more embodiments, the CSI report may include additional information such as an indication of from which NDPs the CSI report was based. The CSI report may be based on a multi-AP channel sounding sequences. For example, one or more of the methods disclosed herein may be performed multiple times and incorporated in the CSI report. Different sounding sequences may be used in combining the results in a CSI report.

Figure 10:
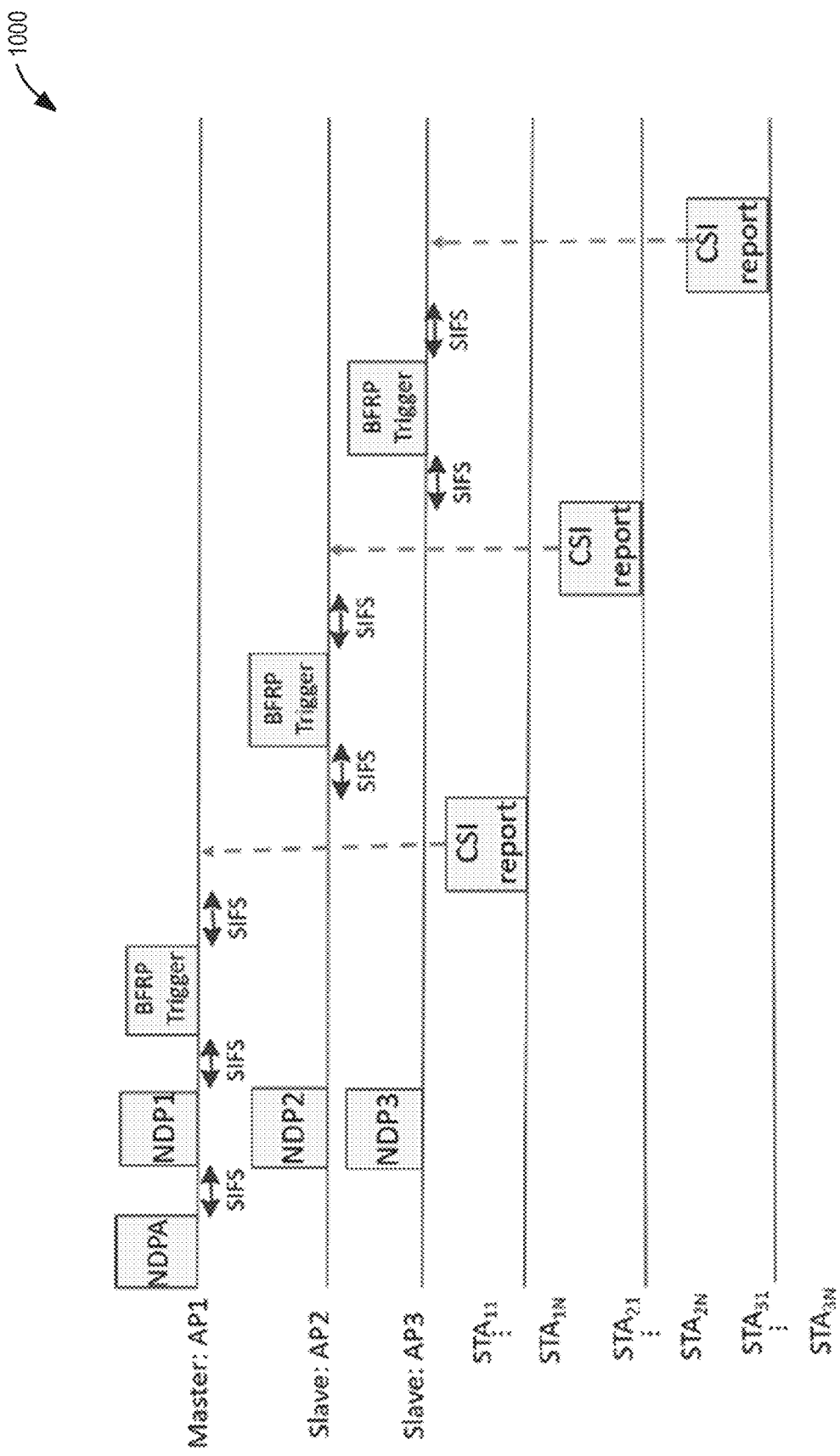
FIG. 10 illustrates a schematic diagram for CSI reporting in multi-AP channel sounding, in accordance with some embodiments.

FIG. 10 illustrates a schematic diagram for CSI reporting in multi-AP channel sounding 1000, in accordance with some embodiments. As illustrated in FIG. 10, each AP sends a beam forming report poll (BFRP) trigger to solicit the CSI report from its own BSS STAs, and STA reports CSI are based on the channel obtained by NDP1, NDP2 and NDP3. In some embodiments, the master AP sends poll frame to poll each slave AP for CSI report collection. The poll frames include the slave AP's basic service set (BSS) identification (ID)(BSSID) info or other ID information (info). After receiving or decoding a polling frame, the slave AP transmits a trigger frame, e.g., a trigger frame of type BFRP, to solicit CSI reports from its own BSS. If a slave AP failed to response to a poll frame with the slave AP indicated as the recipient of the poll frame, the master AP can poll a next slave AP for error recovery. The poll frames enhance the robustness and provide an error recovery method, in accordance with some embodiments.

Figure 11:
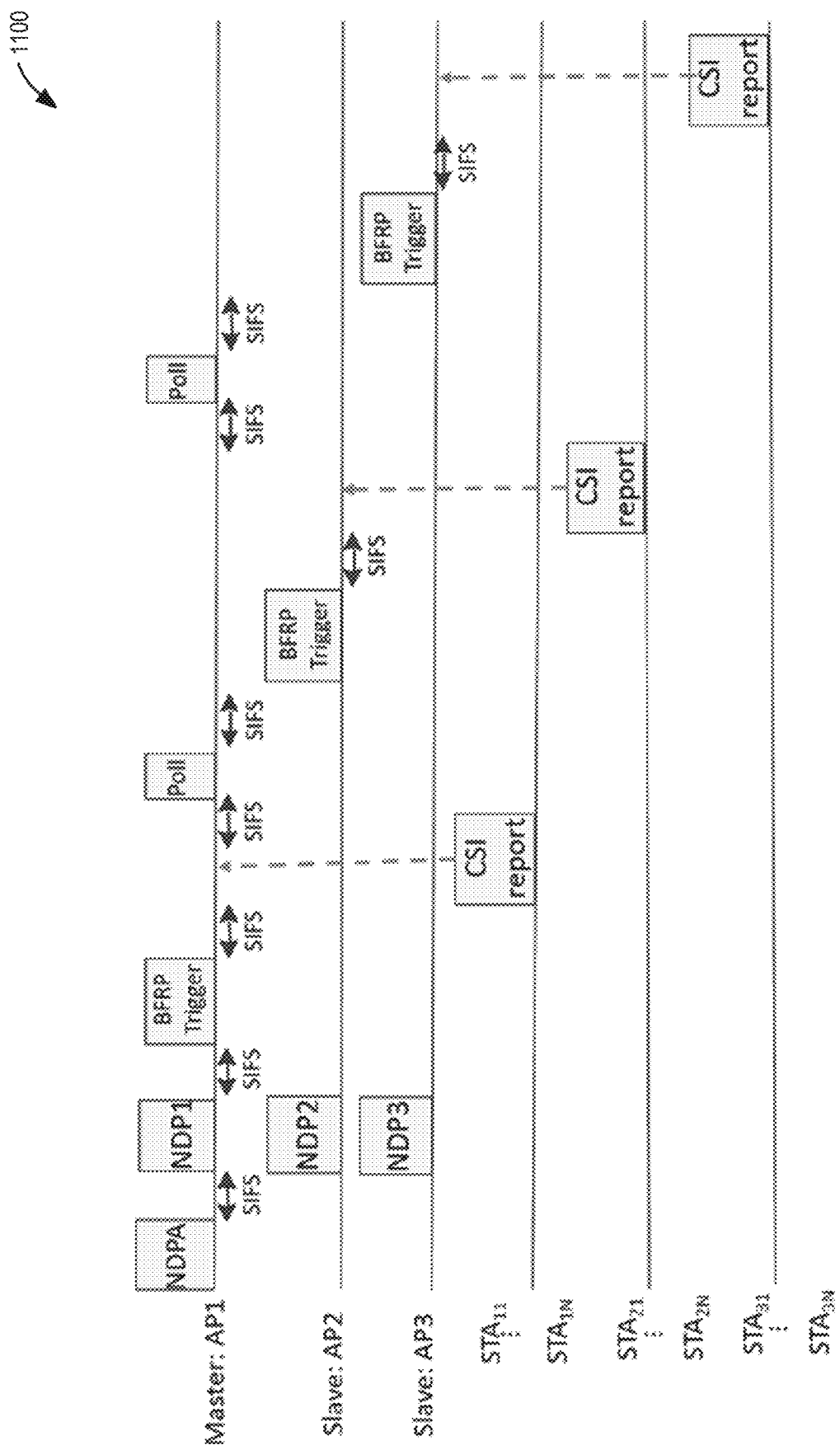
FIG. 11 illustrates a schematic diagram for CSI reporting in multi-AP channel sounding, in accordance with some embodiments.

FIG. 11 illustrates a schematic diagram for CSI reporting in multi-AP channel sounding 1100, in accordance with some embodiments. As illustrated in FIG. 11, each AP uses a BFRP trigger frames sequentially to solicit CSI reports from STAs associated with the AP, e.g., part of the AP's BSS, and the CSI report is prepared based on the NDP1, NDP2, and NDP3. The slave APs may know the order in which to transmit the BFRP trigger frames based on information in the NDPA trigger frame or in the BFRP trigger frame transmitted by the master AP, e.g., AP1. For example, there may be an order of indications of the AP in the NDPA frame transmitted by the master AP and then the slave APs may use that order to transmit the BFRP trigger frames.

Figure 12:
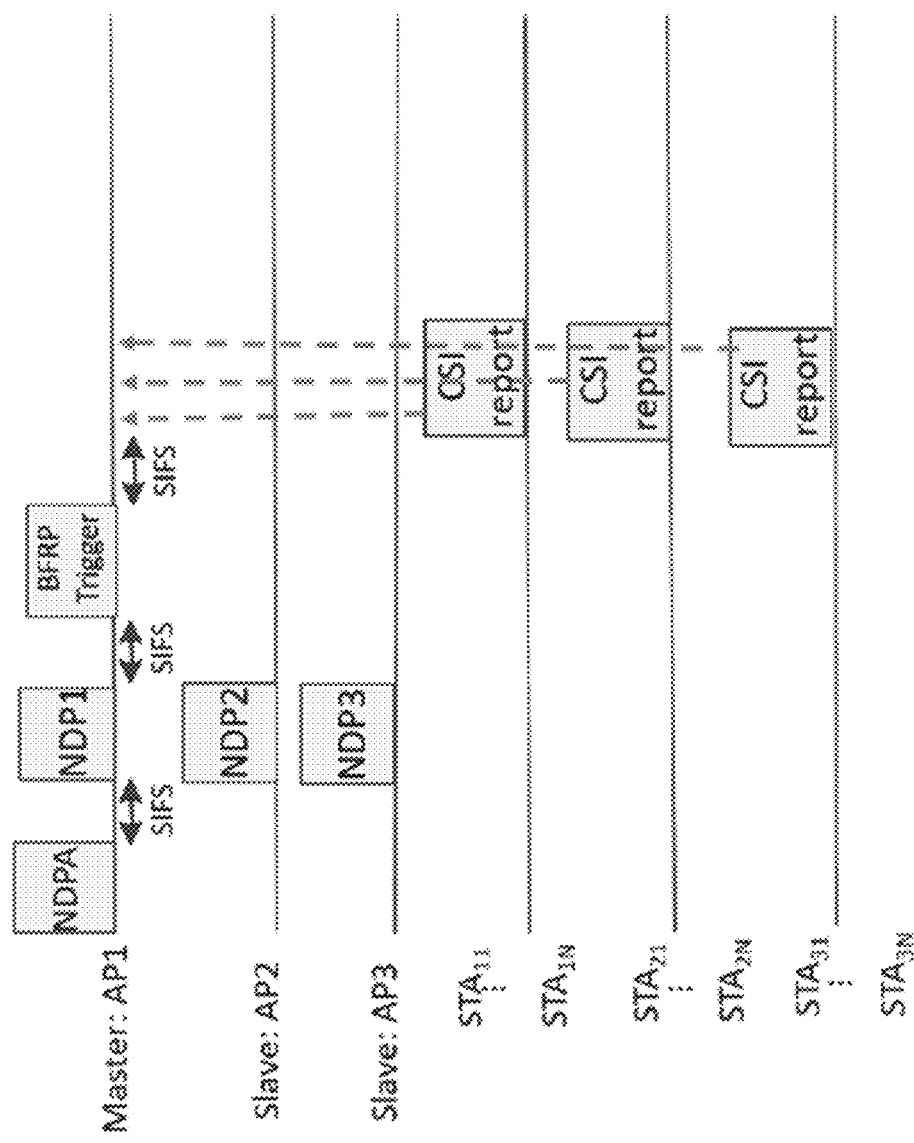
FIG. 12 illustrates a schematic diagram for CSI reporting in multi-AP channel sounding, in accordance with some embodiments.

FIG. 12 illustrates a schematic diagram for CSI reporting in multi-AP channel sounding 1200, in accordance with some embodiments. FIG. 12 illustrates the master AP transmitting a BFRP trigger frame that solicits the CSI reports from all the STAs. The BFRP trigger frame may have identifying information in the BFRP trigger frame that the STAs use to determine to transmit the CSI reports. The information may be based on STA IDs or BSSIDs of the slave APs. The CSI reports are based on the NDP1, NDP2, and NDP3, in accordance with some embodiments. In some embodiments, the BFRP trigger frame may indicate that the STAs, e.g., STA11 . . . STA1N transmit to AP1, STA21 STA2N transmit to AP2, and that STA 31 . . . STA3n transmit to AP3. In some embodiments, all the STAs transmit to the master station or AP1. The master AP may determine that some STAs did not transmit the CSI report and may retransmit a BFRP trigger frame or perform another error recovery method. The master AP1 may receive all the CSI reports and send some to the slave APs via a backhaul network or transmit the CSI reports or setting determined from the CSI reports to the slave APs, In some embodiments, the method 1200 is more efficient than the methods 800, 900, 1000, and 1100, as it requires less time to perform. The following sounding sequence is disclosed after NDP frames are transmitted. The master AP sends a BFRP trigger frame to solicit CSI reports from BSS STAs and OBSS STAs, and the BFRP trigger frame includes ID info for both of BSS STA and OBSS STA. After OBSS STA receives BFRP trigger frame, it is configured to respond to master AP with a CSI report. The CSI report is prepared based on NDP1, NDP2 and NDP3. After master AP completing the CSI report collection, which may include an error recovery operation if some STAs did not respond, the master AP shares the CSI reports with the slave APs using backhaul or other methods.

In FIGS. 8-23, the NDPA may include ID info and CSI feedback info for BSS STA and OBSS STA and include an indication of JT or CBF. In the examples shown above, for each AP, there could be multiple BFRP trigger frames to solicit CSI reports. The number of slave APs may be different such as four or more.

The slave APs disclosed in FIGS. 8-12 may be OBSS APs, in accordance with some embodiments. The master AP may be connected via a backhaul connection with the slave APs. The master AP and one or more slave APs may be co-located. STAs may have multi-APs that are part of a serving set that are servicing a STA. The multiple-APs may be the master AP and one or more slave APs. In some embodiments, a STA will respond to a BFRP trigger frame from an OBSS AP with an CSI report when the BFRP indicates the STA. In some embodiments, the master AP will indicate a method of sharing the wireless spectrum with the slave APs such as frequency, space, or spatial stream sharing. In some embodiments, the master AP or a slave AP shares the frequency/time resources that are obtained in a TXOP with the other APs in the figures as disclosed herein. For example, a trigger frame, NDPA, BFRP trigger frame, and/or poll frame may include an indication of a frequency/time allocation to another AP such as a master AP allocating a frequency/time to a slave AP for transmission of the NDP frame, NDPA frame, or BFRP trigger frame. In some embodiments, the resource allocation may be a resource unit (RU) in increments of 20 MHz. In FIGS. 8-12, for example, the master AP may indicate 20 MHz channels for the slave APs to use to transmit or allocate to stations to transmit CSI reports. In FIGS. 8-12 the master AP may reserve the medium with transmission opportunity for the duration of one or more of the methods of FIGS. 8-12.

The stations may be indicated by the NDPA, BFRP trigger frame, NDPA trigger frame, poll frame, or another frame. The indication of the stations may include an indication of whether the station is a BSS station or an OBSS station. For example, the indication of the stations may be an STA ID field where OBSS Ips are different than BSS IDs.

In accordance with some embodiments, the slave AP is an overlapping basic service set (OBSS) AP, and the slave APs and the master AP are configured to operate in accordance with Institute of Electrical and Electronic Engineering (IEEE) 802.11EHT.

The poll frame is a trigger frame, in accordance with some embodiments. The name poll is used to indicate the function of transmitting the frame, but the poll frame may be referred to by a different name, in accordance with some embodiments. The function of the poll frame is to instruct or configure the slave AP to take the channel for the slave AP's CSI collection.

Figure 13:
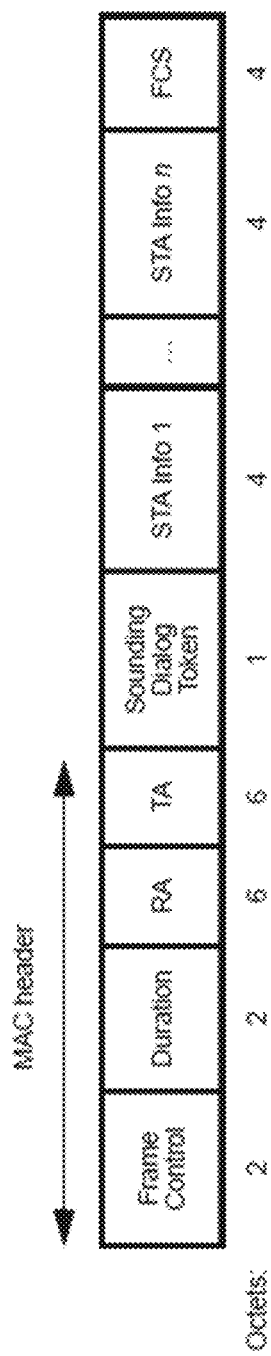
FIG. 13 illustrates a null data packet (NDP) announcement frame 1300, in accordance with some embodiments.
Figure 14:
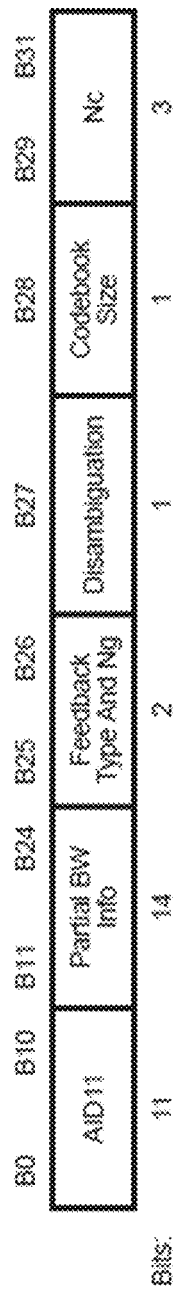
FIG. 14 illustrates a STA information (info) field for the NDP announcement frame of FIG. 13.
Figure 15:
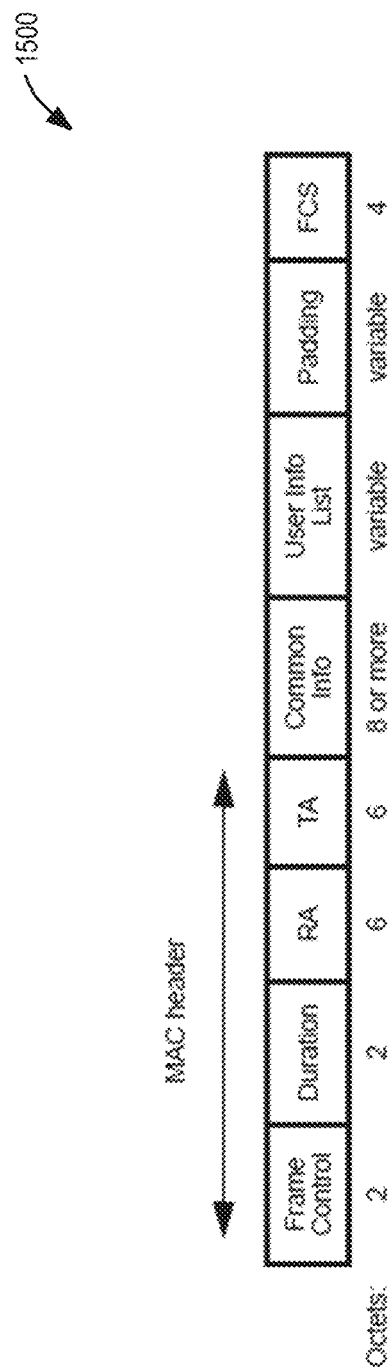
FIG. 15 illustrates a beamforming report poll (BFRP) trigger frame 1500, in accordance with some embodiments.
Figure 16:
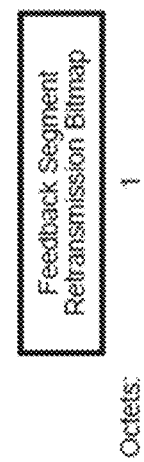
FIG. 16 illustrates a trigger dependent user information (info) field 1600 in accordance with some embodiments.
Figure 17:
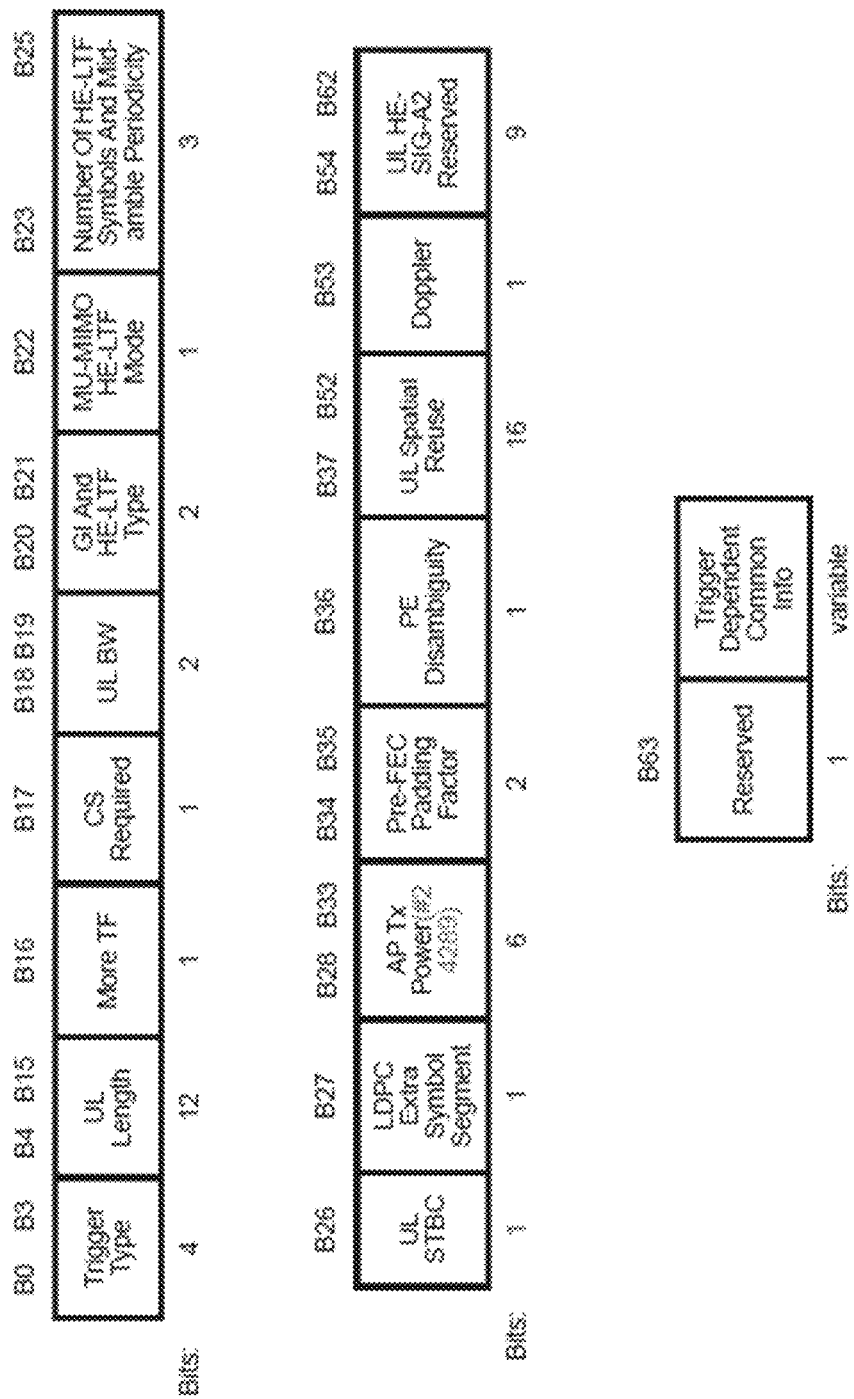
FIG. 17 illustrates a common field in accordance with some embodiments.
Figure 18:
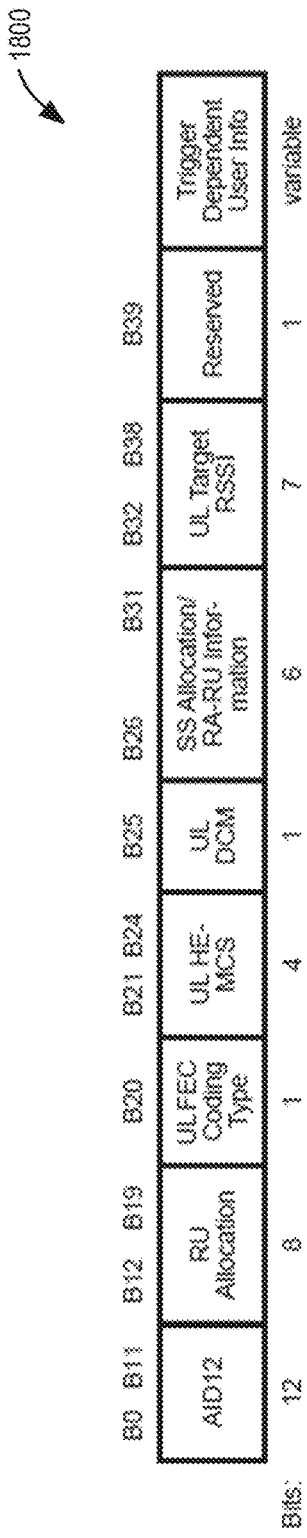
FIG. 18 illustrates a user information field, in accordance with some embodiments.
Figure 19:
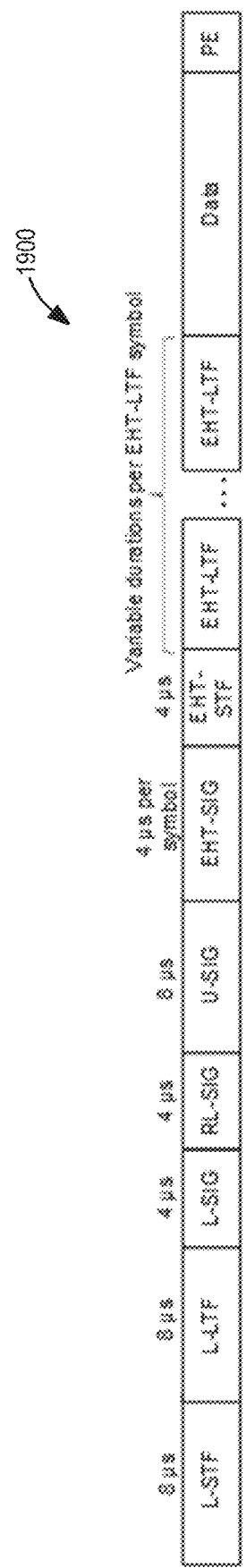
FIG. 19 illustrates a multi-user (MU) PPDU, in accordance with some embodiments.
Figure 20:
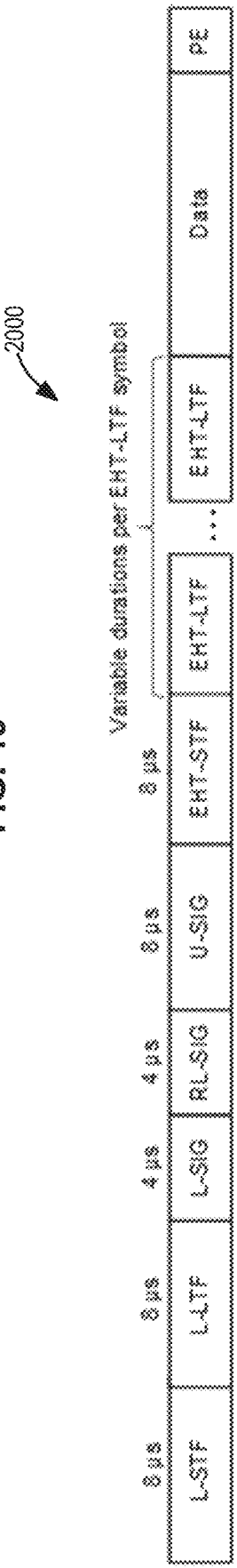
FIG. 20 illustrates a trigger-based (TB) PPDU, in accordance with some embodiments.

FIG. 13 illustrates a null data packet (NDP) announcement frame 1300, in accordance with some embodiments. The NDPA frame 1300 may include ID info for OBSS stations. The NDPA frame 1300 may include additional fields not illustrated such as frequency/time allocations and IDs for slave or OBSS APs. FIG. 14 illustrates a STA information (info) field for the NDP announcement frame 1300 of FIG. 13. The AID11 field may indicate OBSS stations and/or may indicate a BSS or OBSS. FIG. 15 illustrates a beamforming report poll (BFRP) trigger frame 1500, in accordance with some embodiments. The BFRP trigger frame 1500 may include ID info for OBSS stations. The BFRP trigger frame 1500 may include frequency/time allocations and Ds for slave or OBSS APs. The user info list may indicate OBSS stations and/or may indicate a BSS or OBSS. FIG. 16 illustrates a trigger dependent user information (info) field 1600, in accordance with some embodiments. Info field 1600 is for user info field 1800 of FIG. 18, in accordance with some embodiments. FIG. 17 illustrates a common field 1700, in accordance with some embodiments. Common field 1700 is for common information field of FIG. 15, in accordance with some embodiments. FIG. 18 illustrates a user information field 1800, in accordance with some embodiments. User information field 1800 may be a user information field for user info list of FIG. 15. The user info list may indicate OBSS stations and/or may indicate a BSS or OBSS. FIG. 19 illustrates a multi-user (MU) PPDU 1900, in accordance with some embodiments. FIG. 20 illustrates a trigger-based (TB) PPDU 2000, in accordance with some embodiments. The MU PPDU may be used for the NDPA, BFRP trigger frame, and the trigger frame. The TB PPDU may be used for the CSI reports. The packet formats illustrated in FIGS. 13-20 may be used in one or more of the methods as disclosed herein. The packet format may be modified as indicated herein to accommodate the multiple AP format or for other reasons as disclosed herein.

Figure 21:
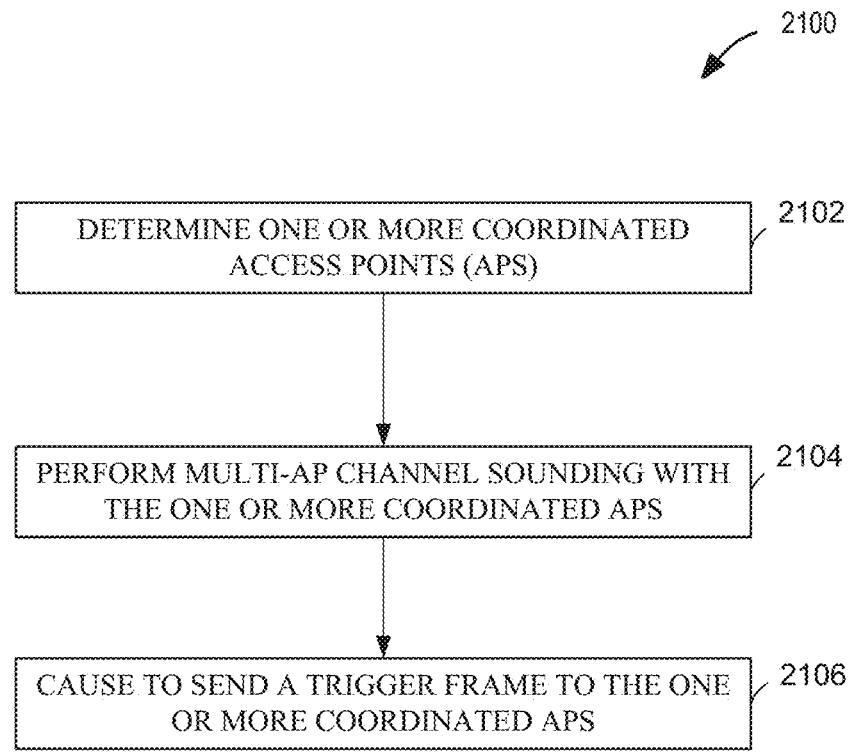
FIG. 21 illustrates a method for CSI reporting in multi-AP channel sounding, in accordance with some embodiments.

FIG. 21 illustrates a method for CSI reporting in multi-AP channel sounding 2100, in accordance with some embodiments. At operation 2102, a device (e.g. EVT AP 502 and/or the EVT STA 504 of FIG. 5) may determine one or more coordinated access points (APs). The coordinate APs may be the slave APs and the master AP as disclosed herein. At operation 2104, the device may perform multi-AP channel sounding with the one or more coordinated APs. At operation 2106, the device may cause to send a trigger frame to the one or more coordinated APs. Method 2100 may include one or more additional operations. Method 2100 may be performed in a different order. One or more of the operations of method 2100 may be optional.

Figure 22:
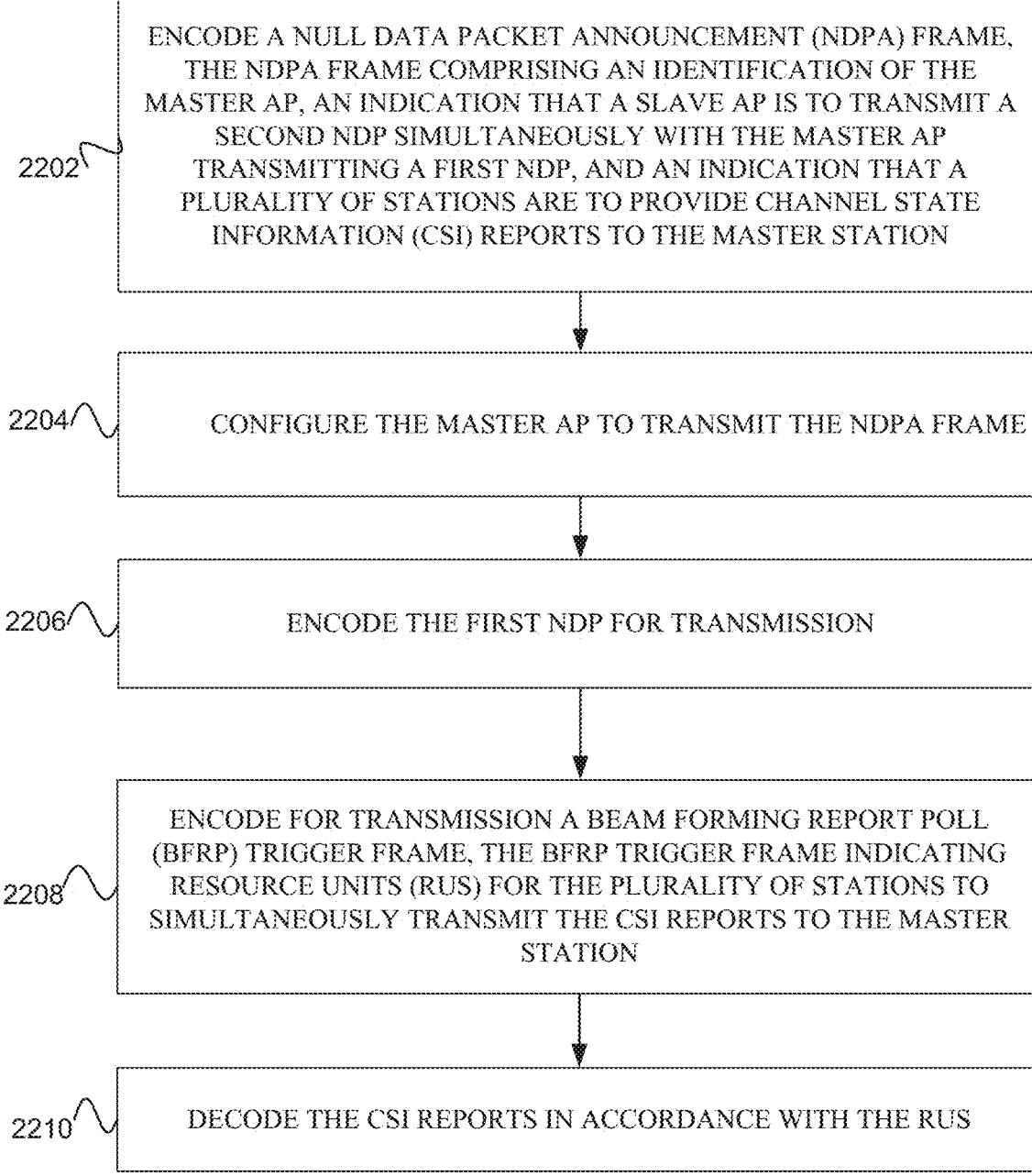
FIG. 22 illustrates a method for CSI reporting in multi-AP channel sounding, in accordance with some embodiments.

FIG. 22 illustrates a method for CSI reporting in multi-AP channel sounding 2200, in accordance with some embodiments. The method 2200 begins at operation 2202 with encoding a NDPA frame, the NDPA frame comprising an identification of the master AP, an indication that a slave AP is to transmit a second NDP simultaneously with the master AP transmitting a first NDP, and an indication that a plurality of stations are to provide CSI reports to the master station. For example, as illustrated in FIG. 8 for AP1 as the master AP and AP2 as the slave AP. Additionally, as illustrated in FIGS. 10-12 with AP2 and AP3 acting as slave APs.

The method 2200 continues at operation 2204 with configure the master AP to transmit the NDPA frame. For example, an apparatus with processing circuitry may configure the master AP of FIGS. 9-12 to transmit the NDPA frame.

The method 2200 continues at operation 2206 with encoding the first NDP for transmission. For example, an apparatus with processing circuitry may encode a NDP for transmission as illustrated in FIGS. 8-12.

The method 2200 continues at operation 2206 with encoding for transmission a BFRP trigger frame, the BFRP trigger frame indicating resource units (RUs) for the plurality of stations to simultaneously transmit the CSI reports to the master station. For example, as illustrated in FIGS. 8-12 an apparatus including processing circuitry may encode the BRFP trigger frame as indicated.

The method 2200 continues at operation 2210 with decoding the CSI reports in accordance with the RUs. For example as illustrated in FIGS. 8-12 the master station may decode the CSI reports from the stations.

The method 2200 may include one or more additional operations. The method 2200 may be performed in a different order. One or more of the operations of method 2200 may be optional.

Figure 23:
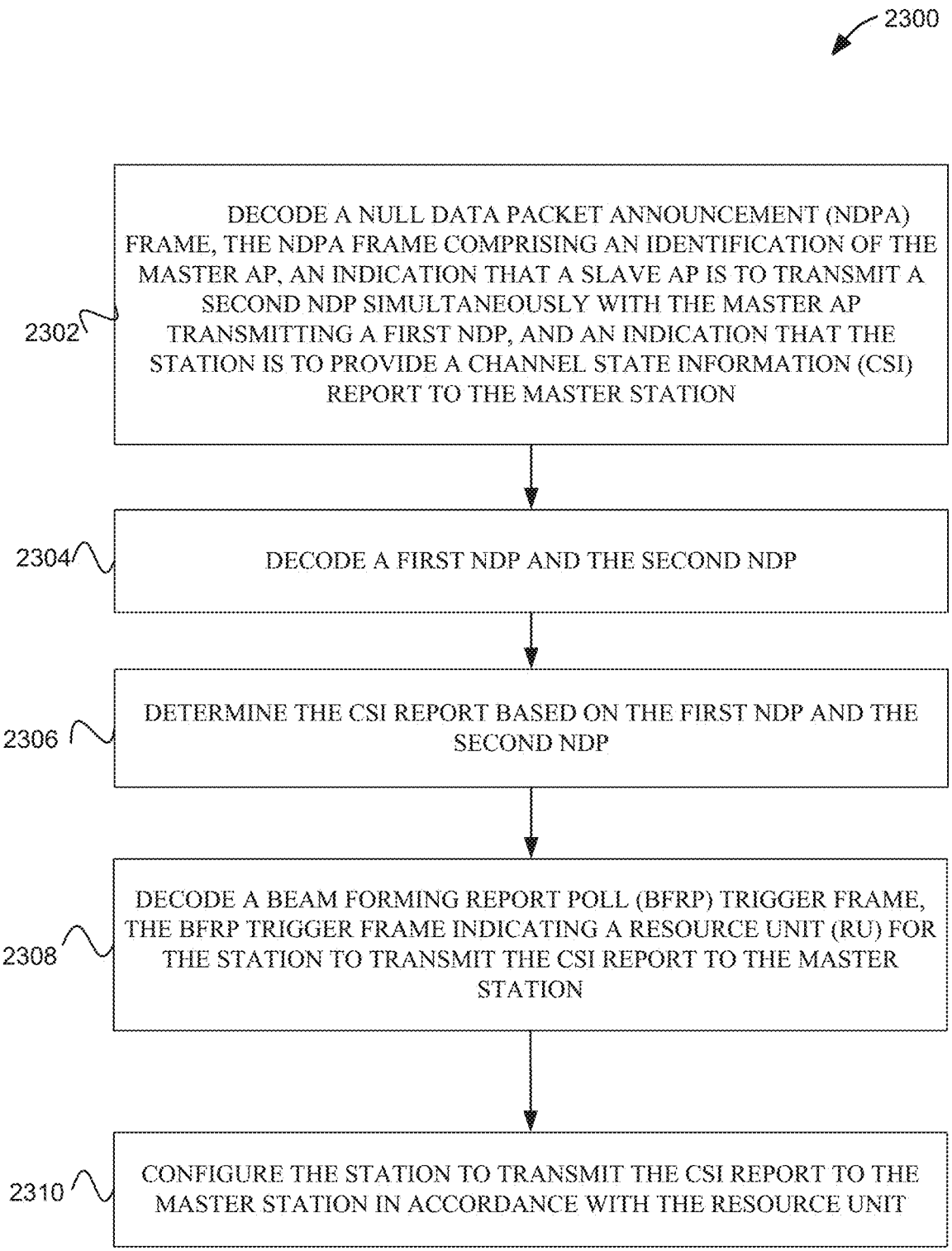
FIG. 23 illustrates a method for CSI reporting in multi-AP channel sounding, in accordance with some embodiments.

FIG. 23 illustrates a method for CSI reporting in multi-AP channel sounding 2300, in accordance with some embodiments. Method 2300 begins at operation 2302 with decoding a NDPA frame, the NDPA frame comprising an identification of the master AP, an indication that a slave AP is to transmit a second NDP simultaneously with the master AP transmitting a first NDP, and an indication that the station is to provide a channel state information (CSI) report to the master station. For example, as illustrated in FIGS. 8-12 the STAs may decode the NDPA.

The method 2300 continues at operation 2304 with decoding a first NDP and the second NDP. For example, as illustrated in FIGS. 8-12 the stations are decoding at least two NDPs and may decode additional NDPs.

The method 2300 continues at operation 2306 with determining the CSI report based on the first NDP and the second NDP. For example, the stations may determine a CSI report based on the received NDPs as disclosed in conjunction with FIGS. 8-12.

The method 2300 continues at operation 2308 with decoding a BFRP trigger frame, the BFRP trigger frame indicating a RU for the station to transmit the CSI report to the master station. For example, as illustrated in FIGS. 8-12 the stations transmit the CSI report in accordance with an RU received from an AP.

The method 2300 continues at operation 2310 with configuring the station to transmit the CSI report to the master station in accordance with the resource unit. For example, as illustrated in FIGS. 8-12 an apparatus of the station may configure the station to transmit the CSI report.

Method 2300 may include one or more additional operations. Method 2300 may be performed in a different order. One or more of the operations of method 2300 may be optional.

FIGS. 24-32 depict illustrative schematic diagrams for passive ranging, in accordance with one or more example embodiments of the present disclosure. In one or more embodiments, a passive ranging system may facilitate one or more of the embodiments as disclosed herein.

In one embodiment, an initiating station (ISTA) negotiated a passive ranging measurement with an responding (RSTA), and the ISTA's location configuration information (LCI) information changes (for example, antenna placement and calibration), so the ISTA sets a new LCI info field (the number of bits for this new LCI info field may be large enough to accommodate the information) in the next coming ISTA-to-RSTA LMR report frame to indicate to the RSTA that the ISTA needs to update the LCI info with RSTA. In the LCI info field in an ISTA-to-RSTA LMR frame, the ISTA may indicate the sub-element ID of the LCI info that has been changed. After RSTA receives an ISTA-to-RSTA LMR frame with the new LCI info field set to 1 (or another value to indicate the change in information), then in the first and second broadcast LMR frames in a passive ranging sequence, the RSTA does not include the ToA or ToD info and may include the changed LCI info subelement for the ISTA or in some embodiments does not include the changed LCI info subelement. The RSTA also sets the new LCI Table in the LCI table countdown field. In some embodiments, the RSTA sets the new LCI Table in the LCI table countdown field to a value that indicates that the next measurement sequence or the next second measurement sequence will carry the new LCI info.

In the next rounding of passive ranging measurement sequence, when the RSTA sends a ranging trigger frame with variant report to solicit the next ISTA-to-RSTA LMR frame from the ISTA with the changed info, the RSTA shall set the new LCI sub-element field (the number of bits for this new field is large enough to accommodate the information) in the trigger dependent user info field to 1 (or another value) to indicate that the ISTA shall report its updated LCI, and also in the user info field of the trigger frame. The RSTA allocates resources for the ISTA, to send the updated LCI, for example, RU size, MCS level and packet length. After the ISTA receives the ranging trigger frame, the ISTA shall include the new LCI sub-element info in the ISTA-to-RSTA LMR and after receiving the new LCI info, the RSTA shall include the new LCI info in the next primus broadcast LMR frame. The primus and secundus broadcast LMR frames may include the ToA and ToD info for the ISTA. After RSTA receives the new LCI from ISTA, if the RSTA does not have enough time to encode the new LCI info in the broadcast LMR of the same measurement sequence, then the RSTA may include the new LCI info the broadcast LMR of next broadcast LMR in the next measurement sequence.

Figure 24:
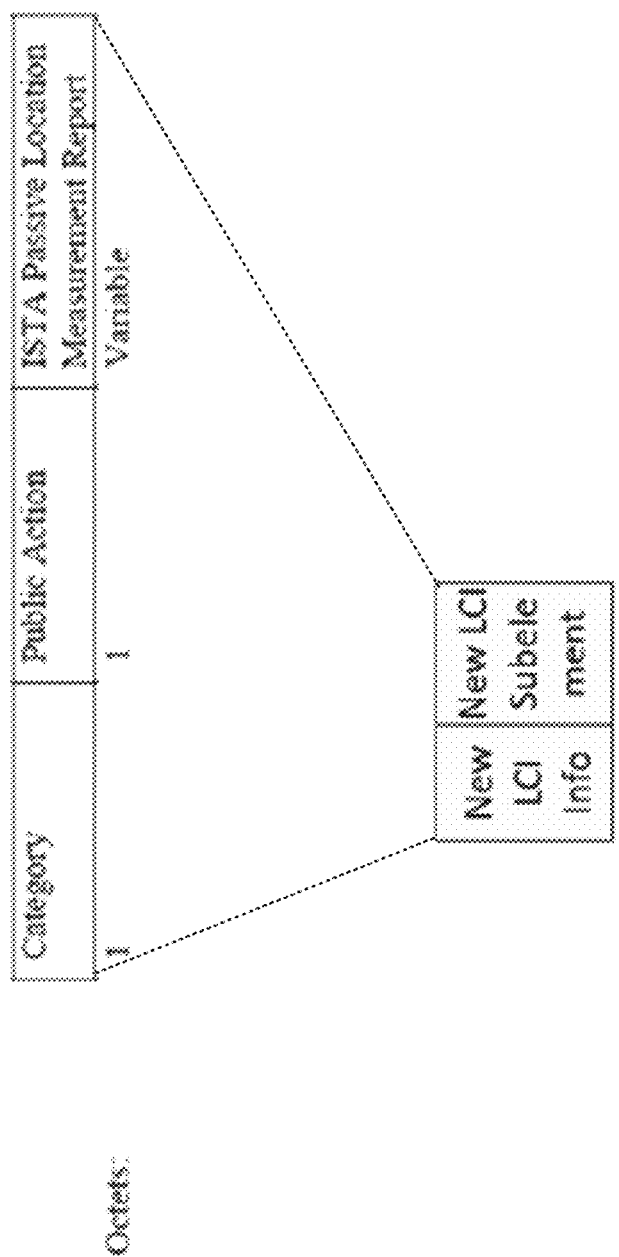
FIG. 24 illustrates an initiating station (ISTA) to responding STA (RSTA) passive location measurement report (LMR) action field format, in accordance with some embodiments.
Figure 25:
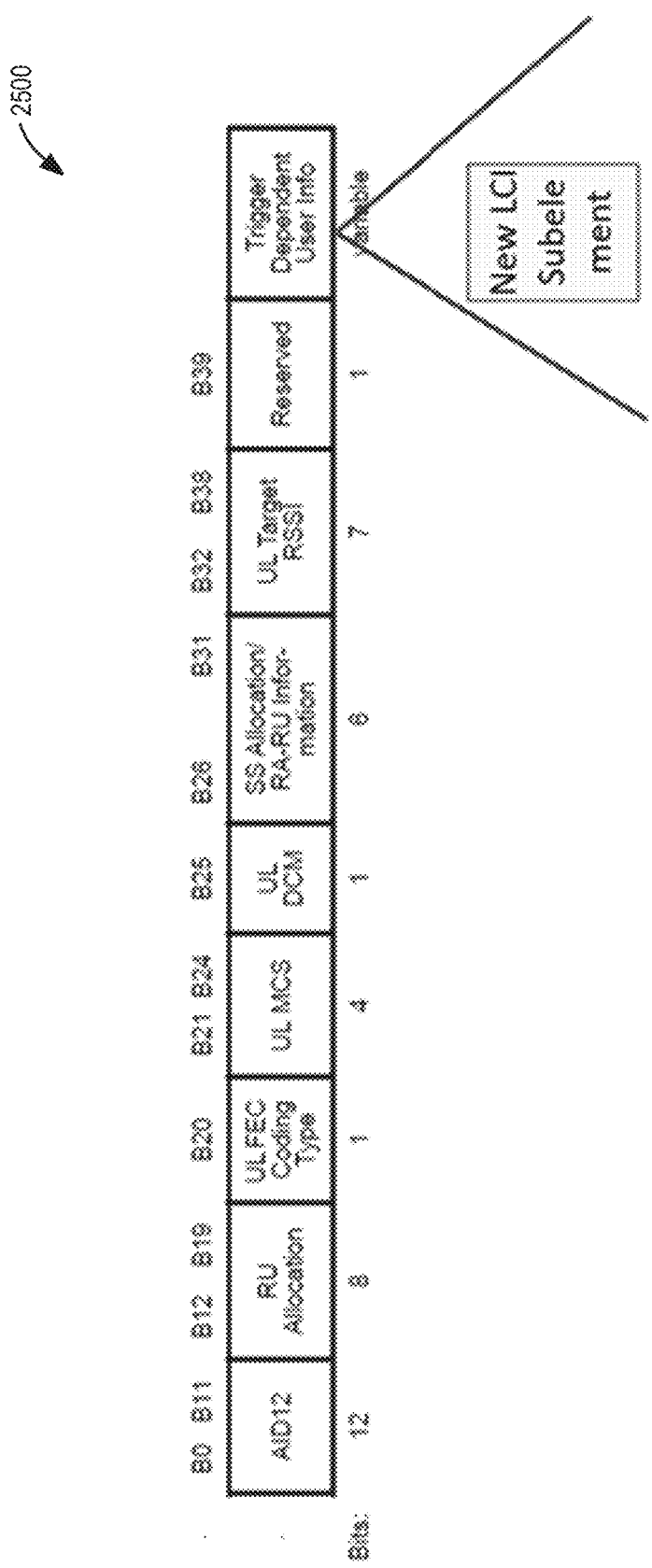
FIG. 25 illustrates a new LCI sub-element in the trigger frame for LMR report, in accordance with some embodiments.

FIG. 24 illustrates an initiating station (ISTA) to responding STA (RSTA) passive location measurement report (LMR) action field format 2400, in accordance with some embodiments. FIG. 24 illustrates an ISTA-to-RSTA LMR 2400, in accordance with some embodiments. FIG. 25 illustrates a new LCI sub-element in the trigger frame for LMR report 2500, in accordance with some embodiments.

Figure 26:
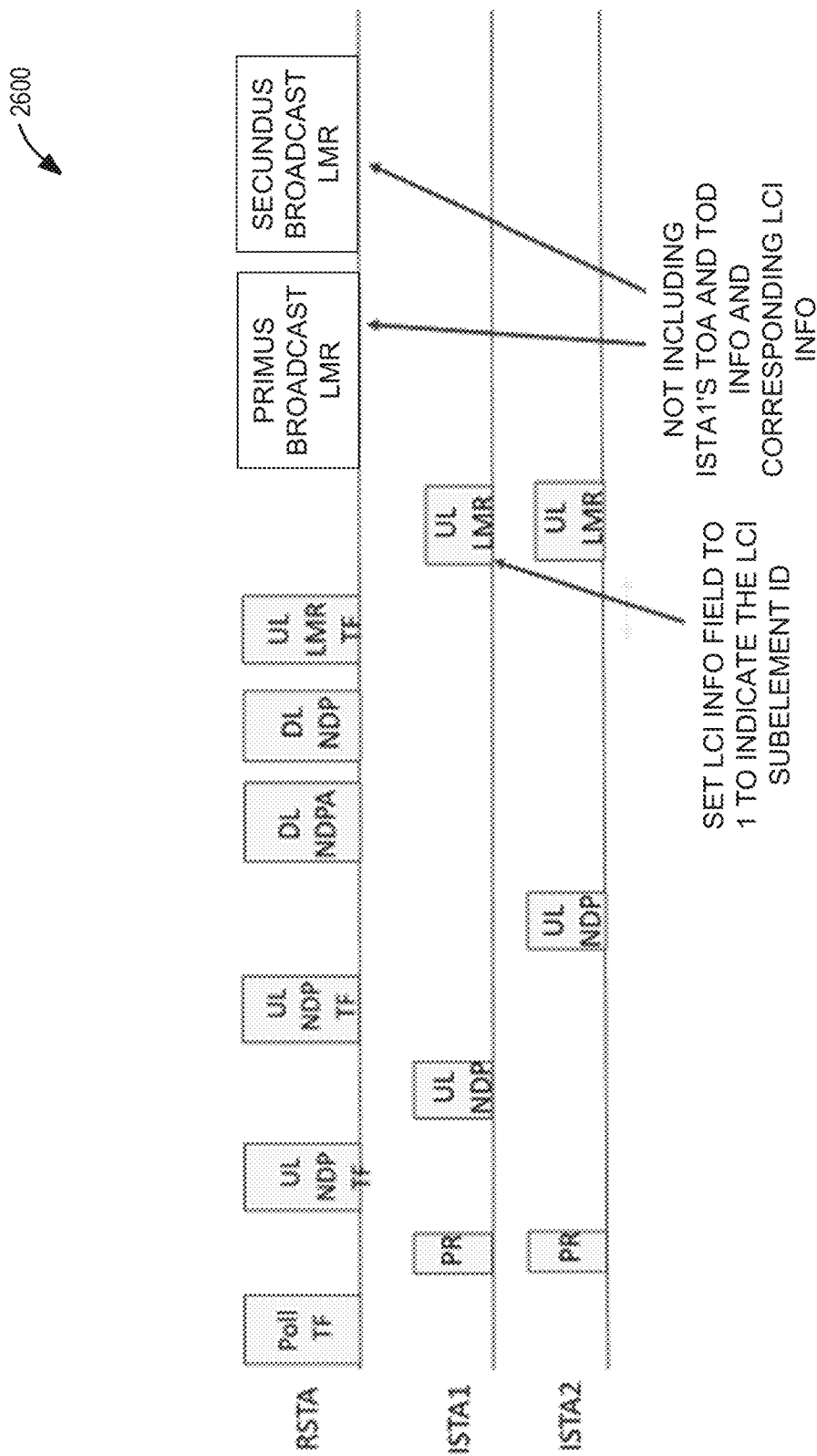
FIG. 26 illustrates a first measurement sequence, in accordance with some embodiments.
Figure 27:
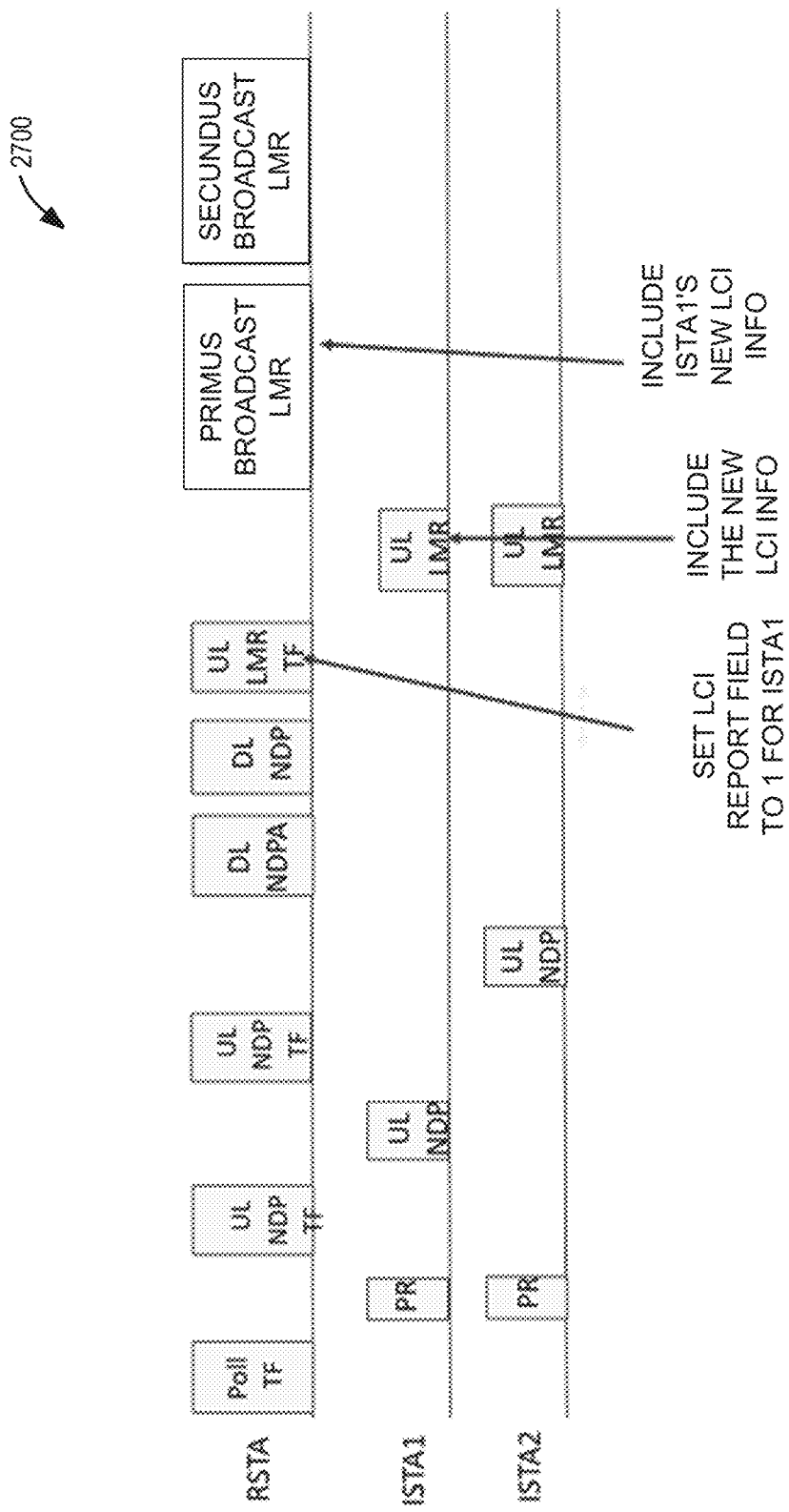
FIG. 27 illustrates a second measurement sequence, in accordance with some embodiments.

FIG. 26 illustrates a first measurement sequence 2600, in accordance with some embodiments. Illustrated in FIG. 26 is the ISTA indicating the LCI change. FIG. 27 illustrates a second measurement sequence 2700, in accordance with some embodiments. Illustrated in FIG. 27 is the ISTA updates the LCI and the RSTA includes the updated LCI in broadcast LMR, e.g., primus broadcast LMR. The RSTA requests with a report field whether a change has occurred or not.

In some embodiments, if an ISTA's LCI sub-element is changed, then at any time during the passive ranging session, if the ISTA detects an idle medium, the ISTA sends a FTM request frame with Trigger field set to 1 (or another) to the RSTA. In the LCI Report field of the FTM request frame, the ISTA includes the new LCI subelement, and after RSTA receives this FTM request from ISTA, the RSTA will respond with an Ack frame, and also the RSTA will update the LCI table of this ISTA in the primus broadcast LMR of passive ranging sequence. For example, in the immediate ranging measurement sequence after receiving the new LCI subelement from ISTA. The RSTA can include all the ISTA's LCI table in the primus broadcast LMR or the RSTA can only include the newly updated ISTA's LCI table. The Passive Location LCI Table Countdown Info field can be keep unchanged as the default value, or it can be set to 0 (or another value) to indicate that the LCI table is contained in this LMR frame. The new LCI table field is set to 1 (or another value) to indicate the LCI report is different compared with the previous LCI report. In some embodiments, the RSTA doesn't update the LCI table in the passive ranging sequence immediately following the ISTA changing LCI, and the RSTA can wait until the passive location LCI Table countdown info becomes 0 to include the new LCI report in the primus broadcast LMR frame.

In some embodiments, if the ISTA's LCI table is changed, the ISTA immediately sends a FTM request frame with trigger field set to 0 (or another value) to RSTA to terminate the ranging session with RSTA and then the ISTA may re-negotiation with RSTA for a passive ranging session and in the initial FTM request frame of negotiation phase, the ISTA's new LCI report is included in this FTM frame. After the RSTA accept the ISTA's request, the RSTA include the ISTA's new LCI report in the primus broadcast LMR frame in the following passive ranging sequence such as the immediately following passive ranging sequence. In some embodiments, the ISTA terminates the ranging session in another way such as by not responding to a frame.

Figure 28:
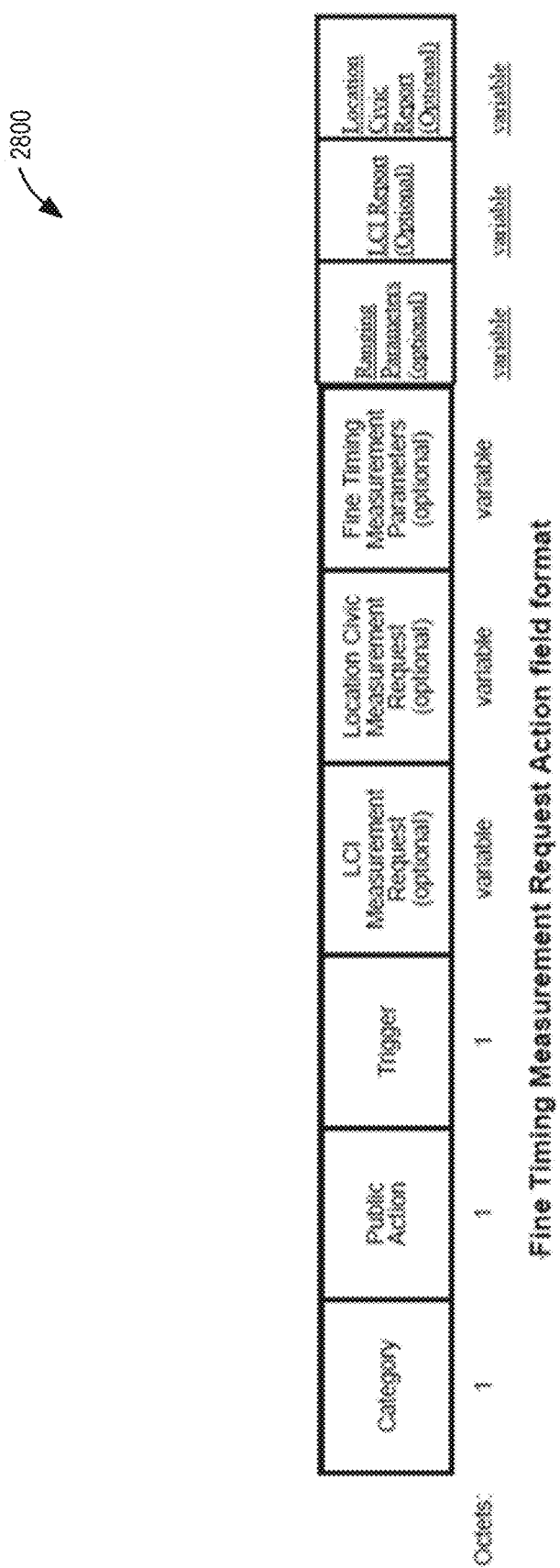
FIG. 28 illustrates a timing measurement request action field format 2800, in accordance with some embodiments.
Figure 30:
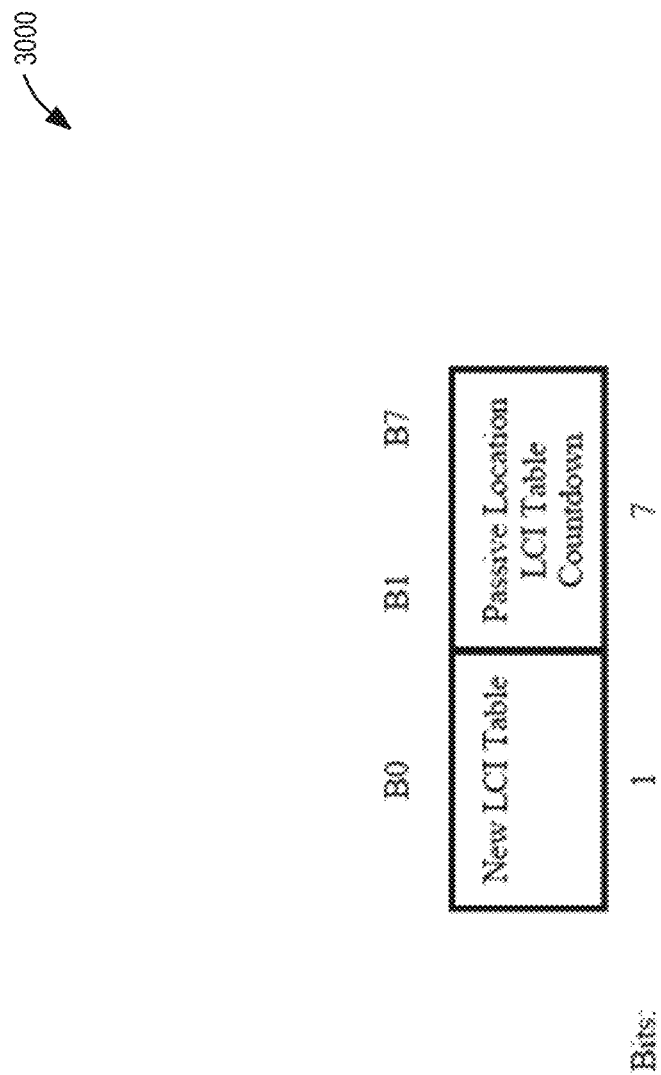
FIG. 30 illustrates a passive TB ranging LCI table countdown field 3000, in accordance with some embodiments.

FIG. 28 illustrates a timing measurement request action field format 2800, in accordance with some embodiments. The timing measurement request action field may include a field to indicate that there is new LCI information. FIG. 29 illustrates a primus RSTA broadcast passive TB ranging measurement report action field format 2900, in accordance with some embodiments. FIG. 30 illustrates a passive TB ranging LCI table countdown field 3000, in accordance with some embodiments.

Figure 31:
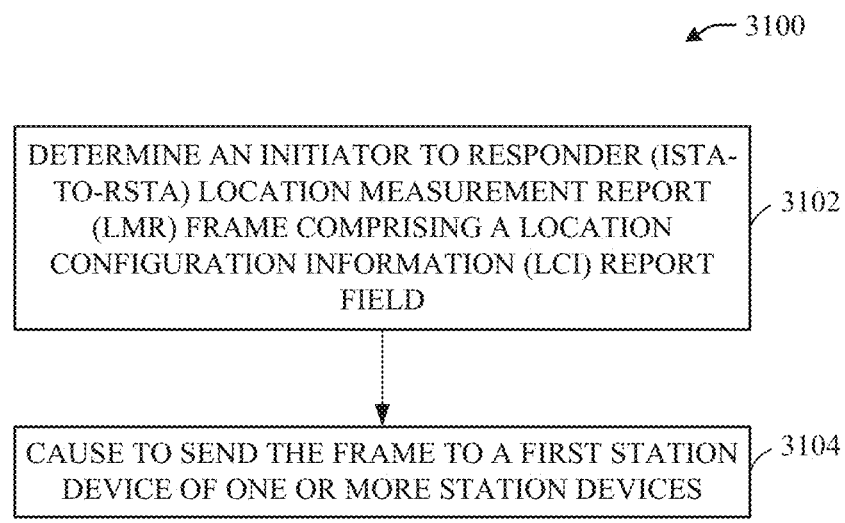
FIG. 31 illustrates a method for a passive ranging system, in accordance with some embodiments.

FIG. 31 illustrates a method 3100 for a passive ranging system, in accordance with some embodiments. At operation 3102, a device (e.g., an EHT STA 504 and/or EHT AP 504 of FIG. 5 configured for IEEE 802.11az) may determine an initiator to responder (TSTA-to-RSTA) location measurement report (LMR) frame comprising a location configuration information (LCI) report field. At block 3104, the device may cause to send the frame to a first station device of one or more station devices.

Figure 32:
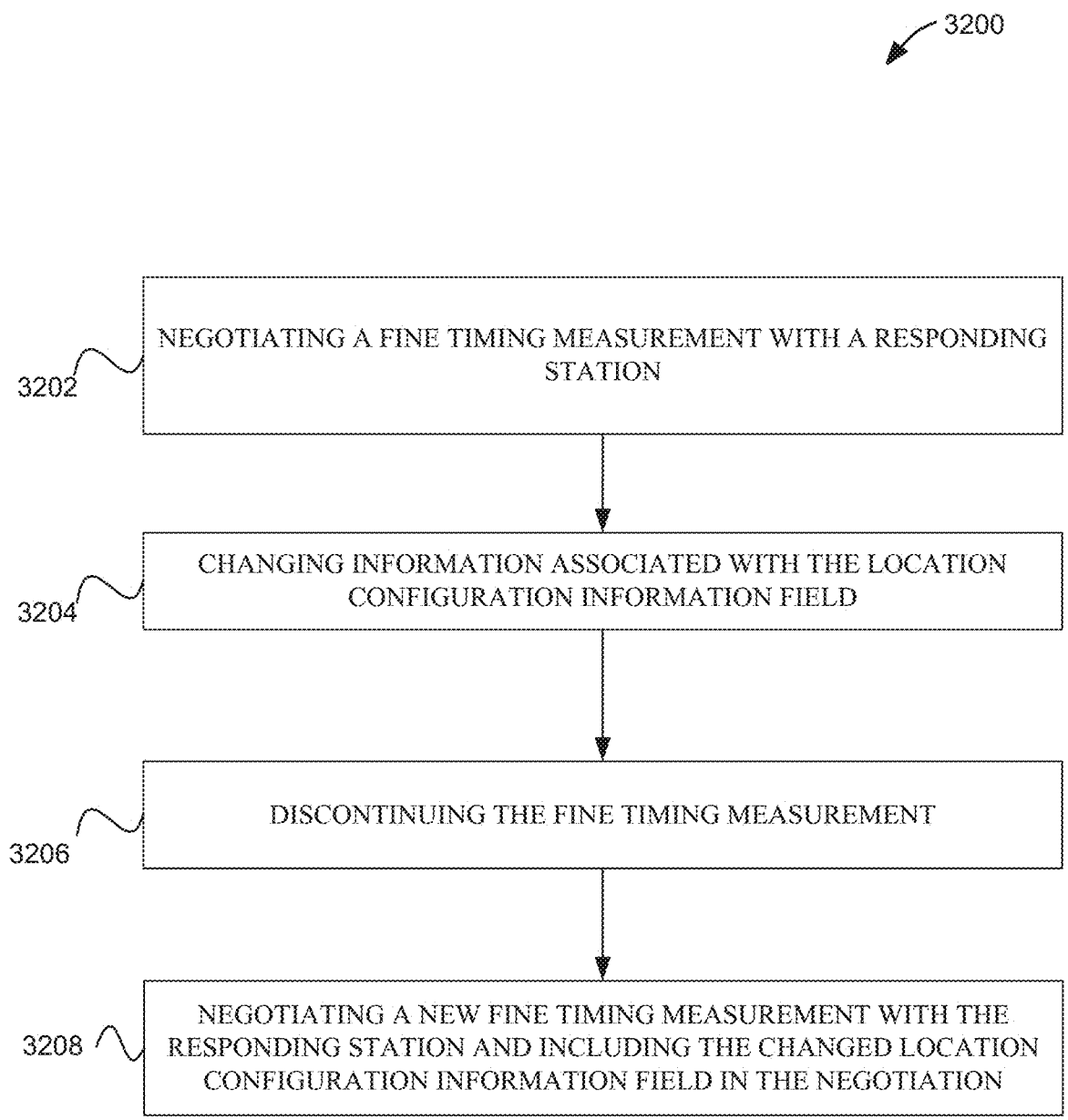
FIG. 32 illustrates a method of updating a location configuration information field, in accordance with some embodiments.

FIG. 32 illustrates a method 3200 of updating a location configuration information field 3200, in accordance with some embodiments. The method 3200 begins at operation 3202 with negotiating a fine timing measurement with a responding station. The ISTA may send an initial LCI field to the RSTA.

The method 3200 continues at operation 3204 with changing information associated with the location configuration information field. For example, the antenna calibration may be changed.

The method 3200 continues at operation 3206 with discontinuing the fine timing measurement. For example, ISTA may notify the responding station that the location configuration information field has changed and stop the FTM method. In some embodiments, the ISTA may simply not respond to a frame transmitted by the RSTA.

The method 3200 continues at operation 3208 with negotiating a new fine timing measurement with the responding station and including the changed location configuration information field in the negotiation. For example, the ISTA can include the updated location configuration information field in one or more of the frames of FIGS. 28-30.

Method 3200 may include one or more additional operations. Method 3200 may be performed in a different order. One or more of the operations of method 3200 may be optional.

Example 1 is an apparatus of a master access point (AP the apparatus comprising memory; and processing circuitry coupled to the memory, the processing circuitry configured to: encode a null data packet announcement (NDPA) frame, the NDPA frame comprising an identification of the master AP, an indication that a slave AP is to transmit a second NDP simultaneously with the master AP transmitting a first NDP, and an indication that a plurality of stations are to provide channel state information (CSI) reports to the master station; configure the master AP to transmit the NDPA frame; encode the first NDP for transmission; encode for transmission a beam forming report poll (BFRP) trigger frame, the BFRP trigger frame indicating allocating resource units (RUs) for the plurality of stations to simultaneously transmit the CSI reports to the master station; and decode the CSI reports in accordance with the RUs.

In Example 2, the subject matter of Example 1 includes, wherein the BFRP trigger frame is a first BFRP trigger frame, the CSI reports are first CSI reports, and the plurality of stations is a first plurality of stations, and wherein the processing circuitry is further configured to: encode for transmission a poll frame, the poll frame to indicate to the slave AP to transmit a second BFRP trigger frame to solicit second CSI reports from a second plurality of stations.

In Example 3, the subject matter of Examples 1-2 includes, wherein the RUs are first RUs, the CSI reports are first CSI reports, and the plurality of stations is a first plurality of stations, and wherein the NDPA frame further comprises an indication that a second plurality of stations are to provide second CSI reports to the master station, wherein the BFRP trigger frame further indicates allocates second RUs for the second plurality of stations to simultaneously transmit the second CSI reports to the master station, and wherein decode the first CSI reports comprises decode the first CSI reports and the second CSI reports.

In Example 4, the subject matter of Example 3 includes, wherein the BFRP trigger frame is a first BFRP trigger frame and wherein the first BFRP trigger frame indicates that the slave AP is to transmit a second BFRP trigger frame an interframe duration after the first plurality of stations has transmitted the first CSI reports and the second plurality of stations has transmitted the second CSI reports.

In Example 5, the subject matter of Examples 1-4 includes, wherein the BFRP trigger frame is a first BFRP trigger frame, the CSI reports are first CSI reports, and the plurality of stations is a first plurality of stations, and wherein the first BFRP trigger frame indicates to the slave AP to transmit a second BFRP trigger frame to solicit second CSI reports from a second plurality of stations after the first plurality of stations transmits the first CSI reports. In Example 6, the subject matter of Examples 2-5 includes, wherein the first CSI reports are based on the first NDP and the second NDP.

In Example 7, the subject matter of Examples 1-6 includes, wherein the NDPA frame comprises an indication of a resource allocation for the slave AP to transmit the second NDP. In Example 8, the subject matter of Example 7 includes, MHz subchannel. In Example 9, the subject matter of Examples 2-8 includes, wherein the slave AP is to transmit the second NDP a short interframe space (SIFS) after receiving the NDPA frame.

In Example 10, the subject matter of Examples 2-9 includes, wherein the first plurality of stations comprises an overlapping basic service set (OBSS) station. In Example 11, the subject matter of Examples 2-10 includes, wherein the indication that the slave AP is to transmit the NDP simultaneously with the master AP comprises an identification of the slave AP. In Example 12, the subject matter of Examples 2-11 includes, wherein the processing circuitry is further configured to: receive from the slave AP the second CSI reports via a backhaul connection.

In Example 13, the subject matter of Examples 2-12 includes, wherein the processing circuitry is further configured to: determining a multi-AP coordinated beamforming (CBF) based on the received first CSI reports.

In Example 14, the subject matter of Examples 1-13 includes, extremely high throughput. In Example 15, the subject matter of Examples 1-14 includes, I NDP frame. In Example 16, the subject matter of Examples 1-15 includes, I NDP frame.

Example 17 is a non-transitory computer-readable storage medium that stores instructions for execution by one or more processors of an apparatus of a station (STA), the instructions to configure the one or more processors to: encode a trigger frame for null data packet announcement (NDPA) frames, the trigger frame comprising an identification of the master AP, an indication that a slave AP is to transmit a second NDPA frame simultaneously with the master AP transmitting a first NDPA frame, and that the slave AP is to transmit a second null data packet (NDP) simultaneously with a master station transmitting a first NDP; configure the master station to transmit the trigger frame; encode the first NDPA frame, the first NDPA frame comprising an identification of the master AP and an indication that a plurality of stations are to provide channel state information (CSI) reports to the master station; configure the master AP to transmit the first NDPA frame; encode a first NDP for transmission; encode for transmission a beam forming report poll (BFRP) trigger frame, the first BFRP trigger frame indicating resource units (RUs) for the plurality of stations to simultaneously transmit the CSI reports to the master station; and decode the CSI reports in accordance with the RUs.

In Example 18, the subject matter of Example 17 includes, wherein the CSI reports are based on the first NDP and the second NDP. Example 19 is an apparatus of a station, the apparatus comprising memory; and processing circuitry coupled to the memory, the processing circuitry configured to: decode a null data packet announcement (NDPA) frame, the NDPA frame comprising an identification of the master AP, an indication that a slave AP is to transmit a second NDP simultaneously with the master AP transmitting a first NDP, and an indication that the station is to provide a channel state information (CSI) report to the master station; decode a first NDP and the second NDP; determine the CSI report based on the first NDP and the second NDP; decode a beam forming report poll (BFRP) trigger frame, the BFRP trigger frame indicating a resource unit (RU) for the station to transmit the CSI report to the master station; and configure the station to transmit the CSI report to the master station in accordance with the resource unit.

In Example 20, the subject matter of Example 19 includes, wherein the master station is an overlapping basic service set (OBSS) AP. Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a primary access point (AP), the apparatus comprising memory; and processing circuitry coupled to the memory, the processing circuitry configured to:
    encode a null data packet announcement (NDPA) frame, the NDPA frame comprising an identification of the primary AP, an indication that a secondary AP is to transmit a second null data packet (NDP) simultaneously with the primary AP transmitting a first NDP, an indication of a resource allocation for the secondary AP to transmit the second NDP, and an indication that a station is to provide a channel state information (CSI) report to the primary station;
    configure the primary AP to transmit the NDPA frame;
    encode for transmission the first NDP;
    encode for transmission a beam forming report poll (BFRP) trigger frame, the BFRP trigger frame indicating a resource unit (RU) allocation for the station to transmit the CSI report to the primary station; and
    decode the CSI report in accordance with the RU allocation.

2. The apparatus of claim 1, wherein the BFRP trigger frame is a first BFRP trigger frame, the CSI report is a first CSI report, and the station is a first station, and wherein the processing circuitry is further configured to:
    encode for transmission a poll frame, the poll frame to indicate to the secondary AP to transmit a second BFRP trigger frame to solicit a second CSI report from a second station.

3. The apparatus of claim 2, wherein the poll frame is a first poll frame, and wherein the processing circuitry is further configured to:
    in response to not receiving the second BRFP trigger frame, encode for transmission a second poll frame, the second poll frame to indicate to the secondary AP to transmit a third BFRP trigger frame to solicit the second CSI report from the second station.

4. The apparatus of claim 1, wherein the RU is a first RU, the CSI reports is a first CSI report, and the station is a first station, and wherein the NDPA frame further comprises an indication that a second station is to provide a second CSI report to the primary station, wherein the BFRP trigger frame further indicates a second RU allocation for the second station to simultaneously transmit the second CSI report to the primary station, and wherein decode the first CSI report comprises decode the first CSI report and the second CSI report.

5. The apparatus of claim 4, wherein the BFRP trigger frame is a first BFRP trigger frame and wherein the first BFRP trigger frame indicates that the secondary AP is to transmit a second BFRP trigger frame an interframe duration after the first station has transmitted the first CSI reports and the second station has transmitted the second CSI report.

6. The apparatus of claim 1, wherein the BFRP trigger frame is a first BFRP trigger frame, the CSI report is a first CSI report, and the station is a first station, and wherein the first BFRP trigger frame indicates to the secondary AP to transmit a second BFRP trigger frame to solicit a second CSI report from a second station after the first station transmits the first CSI report.

7. The apparatus of claim 2, wherein the first CSI report is based on the first NDP and the second NDP.

8. The apparatus of claim 1, wherein the resource allocation comprises one of an 80 MHz subchannel or a 20 MHz subchannel, and wherein the secondary AP is to transmit the second NDP a short interframe space (SIFS) after receiving the NDPA frame.

9. The apparatus of claim 2, wherein the first station is an overlapping basic service set (OBSS) station.

10. The apparatus of claim 2, wherein the indication that the secondary AP is to transmit the NDP simultaneously with the primary AP comprises an identification of the secondary AP.

11. The apparatus of claim 2 wherein the processing circuitry is further configured to:
receive from the secondary AP the second CSI report via a backhaul connection.

12. The apparatus of claim 2, wherein the processing circuitry is further configured to:
determining a multi-AP coordinated beamforming (CBF) based on the received first CSI report.

13. The apparatus of claim 1, wherein the NDPA frame further comprises an indication that a plurality of stations are to provide CSI reports to the primary station and the indication that the plurality of stations are to provide CSI reports to the primary station comprises the indication that the station is to provide the CSI report to the primary station, wherein the BFRP trigger frame comprises an indication of RU allocations for the plurality of stations to simultaneously transmit the CSI reports to the primary station and wherein the plurality of stations comprises the station, and wherein decode the CSI report further comprises decode the CSI reports in accordance with the RU allocations, the RU allocations comprising the RU allocation.

14. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the R2I NDP frame.

15. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the R2I NDP frame.

16. A non-transitory computer-readable storage medium that stores instructions for execution by one or more processors of an apparatus of a primary access point (AP), the instructions to configure the one or more processors to:
encode a trigger frame for null data packet announcement (NDPA) frames, the trigger frame comprising an identification of the primary AP, an indication that a secondary AP is to transmit a second NDPA frame simultaneously with the primary AP transmitting a first NDPA frame, and that the secondary AP is to transmit a second null data packet (NDP) simultaneously with the primary AP transmitting a first NDP;
configure the primary AP station to transmit the trigger frame;
encode the first NDPA frame, the first NDPA frame comprising an identification of the primary AP and an indication that a plurality of stations are to provide channel state information (CSI) reports to the primary AP;
configure the primary AP to transmit the first NDPA frame;
encode a first NDP for transmission;
encode for transmission a beam forming report poll (BFRP) trigger frame, the first BFRP trigger frame indicating resource units (RUs) for the plurality of stations to simultaneously transmit the CSI reports to the primary station; and
decode the CSI reports in accordance with the RUs.

17. The non-transitory computer-readable storage medium of claim 16, wherein the CSI reports are based on the first NDP and the second NDP.

18. An apparatus of a station, the apparatus comprising memory; and processing circuitry coupled to the memory, the processing circuitry configured to:
decode a null data packet announcement (NDPA) frame, the NDPA frame comprising an identification of the primary AP, an indication that a secondary AP is to transmit a second null data packet (NDP) simultaneously with the primary AP transmitting a first NDP, an indication of a resource allocation for the secondary AP to transmit the second NDP, and an indication that the station is to provide a channel state information (CSI) report to the primary station;
decode a first NDP and the second NDP;
determine the CSI report based on the first NDP and the second NDP;
decode a beam forming report poll (BFRP) trigger frame, the BFRP trigger frame indicating a resource unit (RU) for the station to transmit the CSI report to the primary station; and
configure the station to transmit the CSI report to the primary station in accordance with the resource unit.

19. The apparatus of claim 18, wherein the primary station is an overlapping basic service set (OBSS) AP.

* * * * *